US009723330B2

(12) United States Patent
Xu et al.

(10) Patent No.: US 9,723,330 B2
(45) Date of Patent: Aug. 1, 2017

(54) METHOD AND APPARATUS FOR SPARSITY-BASED DE-ARTIFACT FILTERING FOR VIDEO ENCODING AND DECODING

(75) Inventors: Jun Xu, Gainesville, FL (US); Joel Sole, Plainsboro, NJ (US); Peng Yin, Ithaca, NY (US); Yunfei Zheng, Plainsboro, NJ (US)

(73) Assignee: THOMSON LICENSING DTV, Issy les Moulineaux (FR)

( * ) Notice: Subject to any disclaimer, the term of this patent is extended or adjusted under 35 U.S.C. 154(b) by 84 days.

(21) Appl. No.: 12/998,721

(22) PCT Filed: Nov. 18, 2009

(86) PCT No.: PCT/US2009/006161
§ 371 (c)(1),
(2), (4) Date: May 24, 2011

(87) PCT Pub. No.: WO2010/065060
PCT Pub. Date: Jun. 10, 2010

(65) Prior Publication Data
US 2011/0222597 A1    Sep. 15, 2011

Related U.S. Application Data

(60) Provisional application No. 61/117,807, filed on Nov. 25, 2008.

(51) Int. Cl.
*H04N 7/12* (2006.01)
*G06K 9/36* (2006.01)
(Continued)

(52) U.S. Cl.
CPC .......... *H04N 19/86* (2014.11); *H04N 19/117* (2014.11); *H04N 19/14* (2014.11); *H04N 19/154* (2014.11);
(Continued)

(58) Field of Classification Search
CPC .... H04N 19/176; H04N 19/61; H04N 19/117; H04N 19/44; H04N 19/70; H04N 19/82;
(Continued)

(56) References Cited

U.S. PATENT DOCUMENTS 5,761,664 A * 6/1998 Sayah et al.
5,813,018 A * 9/1998 Kaji et al. ................. 715/236
(Continued)

FOREIGN PATENT DOCUMENTS

CN    101203882 A    6/2008
EP    0649250         4/1995
(Continued)

OTHER PUBLICATIONS

Dorea et al., "A Direction-Adaptive In Loop Deartifacting Filter for Video Coding", IEEE International Conference, pp. 1624-1627, Piscataway, NJ, Oct. 12, 2008.
(Continued)

*Primary Examiner* — Dave Czekaj
*Assistant Examiner* — Kehinde O Abimbola
(74) *Attorney, Agent, or Firm* — Brian J. Dorini; Ronald J. Kolczynski

(57) ABSTRACT

Methods and apparatus are provided for sparsity-based de-artifact filtering for video encoding and decoding. An apparatus includes an encoder (400) for encoding at least a portion of an image by grouping regions within the portion based on a grouping metric, transforming the grouped regions, adaptively performing de-artifact filtering on the transformed regions using a de-artifacting filter (413) included in the encoder, inverse transforming the de-artifacted regions to create replacement regions, and restoring the replacement regions to positions with the image from which the regions were taken prior to the grouping.

29 Claims, 11 Drawing Sheets

(51) Int. Cl.
*H04N 19/86* (2014.01)
*H04N 19/70* (2014.01)
*H04N 19/61* (2014.01)
*H04N 19/117* (2014.01)
*H04N 19/14* (2014.01)
*H04N 19/154* (2014.01)
*H04N 19/157* (2014.01)
*H04N 19/18* (2014.01)
*H04N 19/80* (2014.01)

(52) U.S. Cl.
CPC ........... *H04N 19/157* (2014.11); *H04N 19/18* (2014.11); *H04N 19/61* (2014.11); *H04N 19/70* (2014.11); *H04N 19/80* (2014.11)

(58) Field of Classification Search
CPC ............... H04N 19/593; H04N 19/513; G06F 17/30174; G06F 17/30194
USPC .................................................... 375/240.29
See application file for complete search history.

(56) References Cited

U.S. PATENT DOCUMENTS

| | | | | |
|---|---|---|---|---|
| 5,886,702 | A * | 3/1999 | Migdal et al. | 345/423 |
| 6,178,205 | B1 * | 1/2001 | Cheung et al. | 375/240.29 |
| 6,262,739 | B1 * | 7/2001 | Migdal et al. | 345/423 |
| 6,285,805 | B1 * | 9/2001 | Gueziec | 382/299 |
| 6,351,494 | B1 * | 2/2002 | Kondo et al. | 375/240.27 |
| 6,356,592 | B1 * | 3/2002 | Naito | 375/240.29 |
| 6,392,647 | B1 * | 5/2002 | Migdal et al. | 345/423 |
| 6,434,197 | B1 * | 8/2002 | Wang et al. | 375/240.29 |
| 6,452,604 | B1 * | 9/2002 | Sato | 345/619 |
| 6,519,369 | B1 * | 2/2003 | Kondo et al. | 382/261 |
| 6,611,267 | B2 * | 8/2003 | Migdal et al. | 345/428 |
| 6,614,430 | B1 * | 9/2003 | Rappoport | 345/420 |
| 6,628,709 | B2 * | 9/2003 | Lin et al. | 375/240.27 |
| 6,629,065 | B1 * | 9/2003 | Gadh et al. | 703/1 |
| 6,687,388 | B2 * | 2/2004 | Kondo et al. | 382/107 |
| 6,744,818 | B2 * | 6/2004 | Sheraizin et al. | 375/240.29 |
| 6,895,056 | B2 * | 5/2005 | Graley | 375/240.29 |
| 6,898,327 | B1 * | 5/2005 | Hrusecky et al. | 382/260 |
| 6,904,096 | B2 * | 6/2005 | Kobayashi et al. | 375/240.26 |
| 6,983,079 | B2 * | 1/2006 | Kim | 382/275 |
| 7,003,173 | B2 * | 2/2006 | Deshpande | 382/261 |
| 7,027,654 | B1 * | 4/2006 | Ameres et al. | 382/236 |
| 7,046,307 | B1 * | 5/2006 | Hui | 348/700 |
| 7,054,367 | B2 * | 5/2006 | Oguz et al. | 375/240.23 |
| 7,068,722 | B2 * | 6/2006 | Wells | 375/240.16 |
| 7,110,458 | B2 * | 9/2006 | Divakaran et al. | 375/240.25 |
| 7,116,828 | B2 * | 10/2006 | Wells | 382/233 |
| 7,123,652 | B1 * | 10/2006 | McNeely | 375/232 |
| 7,145,607 | B1 * | 12/2006 | Hui | 348/607 |
| 7,190,723 | B2 * | 3/2007 | Schoenblum | 375/240.05 |
| 7,236,521 | B2 * | 6/2007 | Schoenblum | 375/240.03 |
| 7,251,276 | B2 | 7/2007 | Lee et al. | |
| 7,295,610 | B2 * | 11/2007 | Schoenblum | 375/240.03 |
| 7,352,909 | B2 * | 4/2008 | Guleryuz | 382/254 |
| 7,394,856 | B2 * | 7/2008 | Bhaskaran | 375/240.29 |
| 7,397,853 | B2 * | 7/2008 | Kwon et al. | 375/240.03 |
| 7,397,854 | B2 * | 7/2008 | Kwon et al. | 375/240.03 |
| 7,400,679 | B2 * | 7/2008 | Kwon et al. | 375/240.03 |
| 7,440,504 | B2 * | 10/2008 | MacInnis et al. | 375/240.29 |
| 7,450,641 | B2 * | 11/2008 | Sun et al. | 375/240.16 |
| 7,460,596 | B2 * | 12/2008 | Kwon et al. | 375/240.03 |
| 7,471,724 | B2 * | 12/2008 | Lee | 375/240.12 |
| 7,486,719 | B2 * | 2/2009 | Ozawa | 375/219 |
| 7,496,141 | B2 * | 2/2009 | Kwon et al. | 375/240.03 |
| 7,539,248 | B2 * | 5/2009 | Kwon et al. | 375/240.24 |
| 7,590,296 | B2 * | 9/2009 | Kobayashi | 382/238 |
| 7,613,240 | B2 * | 11/2009 | Sun et al. | 375/240.16 |
| 7,697,782 | B2 * | 4/2010 | Pan | 382/275 |
| 7,734,110 | B2 * | 6/2010 | Bosco et al. | 382/264 |
| 7,738,722 | B2 * | 6/2010 | Gomila et al. | 382/254 |
| 7,747,094 | B2 * | 6/2010 | Sekiguchi et al. | 382/239 |
| 7,787,542 | B2 * | 8/2010 | Sun et al. | 375/240.29 |
| 7,826,535 | B2 * | 11/2010 | Alvarez | 375/240.26 |
| 7,865,035 | B2 * | 1/2011 | Lin et al. | 382/275 |
| 7,876,833 | B2 * | 1/2011 | Segall et al. | 375/240.24 |
| 7,885,341 | B2 * | 2/2011 | Chen et al. | 375/240.29 |
| 7,894,522 | B2 * | 2/2011 | Paniconi et al. | 375/240.12 |
| 7,907,667 | B2 * | 3/2011 | Sun et al. | 375/240.18 |
| 7,907,789 | B2 * | 3/2011 | Yong | 382/268 |
| 7,920,628 | B2 * | 4/2011 | Kojokaro et al. | 375/240.16 |
| 7,929,614 | B2 * | 4/2011 | Cho et al. | 375/240.25 |
| 8,005,308 | B2 * | 8/2011 | Paniconi et al. | 382/236 |
| 8,040,957 | B2 * | 10/2011 | Sun et al. | 375/240.29 |
| 8,050,331 | B2 * | 11/2011 | Lelescu et al. | 375/240.29 |
| 8,055,087 | B2 * | 11/2011 | Paniconi | 382/232 |
| 8,059,908 | B2 * | 11/2011 | Paniconi | 382/260 |
| 8,059,909 | B2 * | 11/2011 | Paniconi | 382/261 |
| 8,081,209 | B2 * | 12/2011 | Ji et al. | 348/115 |
| 8,111,760 | B2 * | 2/2012 | Hung et al. | 375/240.29 |
| 8,139,650 | B2 * | 3/2012 | Cunha et al. | 375/240.29 |
| 8,139,883 | B2 * | 3/2012 | Zhang et al. | 382/254 |
| 8,175,405 | B1 * | 5/2012 | Pathak | 382/254 |
| 8,199,812 | B2 * | 6/2012 | Ye et al. | 375/240.02 |
| 8,204,128 | B2 * | 6/2012 | Huchet et al. | 375/240.18 |
| 8,218,634 | B2 * | 7/2012 | Guleryuz | 375/240.16 |
| 8,237,868 | B2 * | 8/2012 | Takeda et al. | 348/701 |
| 8,253,752 | B2 | 8/2012 | Raveendran | |
| 8,259,819 | B2 * | 9/2012 | Liu et al. | 375/240.29 |
| 8,427,583 | B2 * | 4/2013 | Segall | 348/607 |
| 8,446,965 | B2 * | 5/2013 | Tanaka | 375/240.29 |
| 2001/0017944 | A1 * | 8/2001 | Kalevo et al. | 382/268 |
| 2002/0122494 | A1 * | 9/2002 | Sheraizin et al. | 375/240.29 |
| 2002/0136312 | A1 * | 9/2002 | Graley | 375/240.29 |
| 2003/0053541 | A1 * | 3/2003 | Sun et al. | 375/240.16 |
| 2003/0081854 | A1 * | 5/2003 | Deshpande | 382/261 |
| 2003/0117397 | A1 * | 6/2003 | Hubrecht et al. | 345/420 |
| 2003/0122967 | A1 * | 7/2003 | Kondo et al. | 348/607 |
| 2003/0156127 | A1 * | 8/2003 | Kleyman | 345/672 |
| 2003/0194013 | A1 * | 10/2003 | Alvarez | 375/240.24 |
| 2004/0017385 | A1 * | 1/2004 | Cosman et al. | 345/629 |
| 2004/0179610 | A1 * | 9/2004 | Lu et al. | 375/240.25 |
| 2005/0063475 | A1 * | 3/2005 | Bhaskaran | 375/240.29 |
| 2005/0243911 | A1 * | 11/2005 | Kwon et al. | 375/240.03 |
| 2005/0243913 | A1 * | 11/2005 | Kwon et al. | 375/240.03 |
| 2005/0243914 | A1 * | 11/2005 | Kwon et al. | 375/240.03 |
| 2005/0243916 | A1 * | 11/2005 | Kwon et al. | 375/240.03 |
| 2006/0023794 | A1 * | 2/2006 | Wan et al. | 375/240.29 |
| 2006/0133504 | A1 * | 6/2006 | Jung et al. | 375/240.16 |
| 2006/0140278 | A1 | 6/2006 | Gomila et al. | |
| 2006/0262854 | A1 | 11/2006 | Lelescu et al. | |
| 2007/0009044 | A1 * | 1/2007 | Tourapis et al. | 375/240.25 |
| 2007/0064798 | A1 * | 3/2007 | Paniconi et al. | 375/240.12 |
| 2007/0064804 | A1 * | 3/2007 | Paniconi et al. | 375/240.16 |
| 2007/0064816 | A1 * | 3/2007 | Chiang et al. | 375/240.29 |
| 2007/0081596 | A1 * | 4/2007 | Lin et al. | 375/240.27 |
| 2007/0092000 | A1 * | 4/2007 | Chen et al. | 375/240.03 |
| 2007/0098076 | A1 * | 5/2007 | Sun et al. | 375/240.16 |
| 2007/0098077 | A1 * | 5/2007 | Sun et al. | 375/240.18 |
| 2008/0037650 | A1 * | 2/2008 | Stojancic et al. | 375/240.24 |
| 2008/0165863 | A1 * | 7/2008 | Yan | 375/240.29 |
| 2009/0028249 | A1 * | 1/2009 | Gomila et al. | 375/240.29 |
| 2009/0141814 | A1 * | 6/2009 | Yin et al. | 375/240.29 |
| 2009/0161770 | A1 * | 6/2009 | Dong et al. | 375/240.29 |
| 2009/0180555 | A1 * | 7/2009 | Sun et al. | 375/240.29 |
| 2009/0257664 | A1 * | 10/2009 | Kao et al. | 382/232 |
| 2009/0322871 | A1 * | 12/2009 | Ji et al. | 348/115 |
| 2010/0027686 | A1 * | 2/2010 | Zuo et al. | 375/240.29 |
| 2010/0104027 | A1 * | 4/2010 | Youn et al. | 375/240.29 |
| 2010/0118940 | A1 * | 5/2010 | Yin et al. | 375/240.12 |
| 2010/0118981 | A1 * | 5/2010 | Escoda et al. | 375/240.29 |
| 2010/0128803 | A1 * | 5/2010 | Divorra Escoda et al. | 375/240.29 |
| 2010/0220788 | A1 * | 9/2010 | Wittmann et al. | 375/240.16 |
| 2010/0220794 | A1 * | 9/2010 | Zhou | 375/240.29 |
| 2010/0246692 | A1 * | 9/2010 | Rusanovskyy et al. | 375/240.29 |
| 2010/0272191 | A1 * | 10/2010 | Dorea et al. | 375/240.29 |
| 2010/0316139 | A1 * | 12/2010 | Le Leannec et al. | |
| 2010/0329362 | A1 * | 12/2010 | Choi et al. | 375/240.29 |
| 2012/0114048 | A1 * | 5/2012 | Sole et al. | 375/240.25 |
| 2012/0170668 | A1 * | 7/2012 | Zhang et al. | 375/240.29 |

(56) References Cited

U.S. PATENT DOCUMENTS

| | | | |
|---|---|---|---|
| 2012/0183078 A1* | 7/2012 | Lai et al. | 375/240.25 |
| 2012/0201311 A1* | 8/2012 | Sole et al. | 375/240.29 |
| 2012/0207227 A1* | 8/2012 | Tsai et al. | 375/240.29 |
| 2012/0257681 A1* | 10/2012 | Sato | 375/240.25 |
| 2012/0287995 A1* | 11/2012 | Budagavi | 375/240.12 |
| 2013/0003865 A1* | 1/2013 | Norkin et al. | 375/240.25 |
| 2013/0028327 A1* | 1/2013 | Narroschke et al. | 375/240.16 |
| 2013/0051480 A1* | 2/2013 | Norkin et al. | 375/240.29 |
| 2013/0077697 A1* | 3/2013 | Chen et al. | 375/240.25 |
| 2013/0142267 A1* | 6/2013 | Esenlik et al. | 375/240.29 |

FOREIGN PATENT DOCUMENTS

| | | |
|---|---|---|
| EP | 1841230 | 10/2007 |
| EP | 1944974 | 7/2008 |
| JP | 200059769 A | 2/2000 |
| JP | 2008-518510 A | 5/2008 |
| JP | 2008-182562 A | 8/2008 |
| JP | 2008541672 | 11/2008 |
| JP | 2009545212 A | 12/2009 |
| JP | 2010509842 A | 3/2010 |
| WO | WO2006127546 A2 | 11/2006 |
| WO | WO-2008011502 A2 | 1/2008 |
| WO | WO-2008057308 A2 | 5/2008 |
| WO | WO2008084482 | 7/2008 |

OTHER PUBLICATIONS

Guleryuz et al., "A Nonlinear Loop Filter for Quantization Noise Removal in Hybrid Video Compression", DoCoMo USA Laboratories, Inc. San Jose, CA.

Olshausen et al., "Vision and the Coding of Natural Images", American Scientist, vol. 88, pp. 238-245, May-Jun. 2000.

Dabov et al., "Image Denoising by Sparse 3D Transform-Domain Collaborative Filtering", IEEE Transactions on Image Processing, vol. 16, No. 8, Aug. 2007.

Escoda et al., "A Multi-Lattice Direction-Adaptive Deartifacting Filter for Image & Video Coding", Thomson Corporate Research, Princeton, New Jersey.

Li et al., "Patch-Based Video Processing: A Variational Bayesian Approach", Lane Department of Computer Science and Electrical Engineering, Morgantown, WV, 2008 IEEE.

Aharon et al., "K-SVD: An Algorithm for Designing of Overcomplete Dictionaries for Sparse Representation", Department of Computer Science, Haifa, Israel.

Karczewicz et al., "Post-Filter SEI Message Extensions", ITU—Telecommunications Standarization Sector, Document: VCEG-A134, 35th Meeting: Berlin, Germany, Jul. 16-18, 2008.

Search Report.

Linsuo, et al., "image Denoising by Sparse Code Shrinkage", Signal Processing, Oct. 2007, pp. 742-746, vol. 23, No. 5.

ITU-T Rec. H.264, "Advanced Video Coding for Generic Audio-visual Services" Mar. 2005.

\* cited by examiner

METHOD AND APPARATUS FOR SPARSITY-BASED DE-ARTIFACT FILTERING FOR VIDEO ENCODING AND DECODING

CROSS-REFERENCE TO RELATED APPLICATIONS

This application claims the benefit of U.S. Provisional Application Ser. No. 61/117,807, filed 25 Nov., 2008, which is incorporated by reference herein in its entirety.

TECHNICAL FIELD

The present principles relate generally to video encoding and decoding and, more particularly, to methods and apparatus for sparsity-based de-artifact filtering for video encoding and decoding.

BACKGROUND

Many hybrid video coding technologies employ motion compensation and block-based transforms (e.g., discrete cosine transforms (DCTs)) to reduce correlation in the spatial and temporal domains. Coarse quantization of transform coefficients and the absence of visual quality constraints in rate-distortion (RD) based optimization may give rise to visual artifacts.

In the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), an in-loop deblocking filter is employed to reduce blocky artifacts arising along coded block boundaries. Such artifacts are caused by coarse quantization of the transform (DCT) coefficients as well as motion compensated prediction. By applying low-pass filters to the block edges, the deblocking filter can improve both subjective and objective video quality.

Turning to FIG. 1, a video encoder capable of performing video encoding in accordance with the MPEG-4 AVC Standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 320.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Turning to FIG. 2, a video decoder capable of performing video decoding in accordance with the MPEG-4 AVC Standard is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

The above mentioned deblocking filter operates by performing an analysis of the samples around a block edge and adapting the filtering strength to attenuate small intensity differences attributable to blocky artifacts while preserving the generally larger intensity differences pertaining to the actual image content. Several block coding modes and conditions also serve to indicate the strength with which the filters are applied. These include inter/intra prediction decisions and the presence of coded residuals and motion differences between adjacent blocks. Besides adaptability on the block-level, the deblocking filter is also adaptable at the slice-level and at the sample-level. On the slice level, filtering strength can be adjusted to the individual characteristics of the video sequence. On the sample level, filtering can be turned off at each individual sample depending on the sample value and quantizer-based thresholds.

However, the blocky artifacts removed by the MPEG-4 AVC Standard deblocking filter are not the only artifacts that are present in compressed video. Coarse quantization is also responsible for other artifacts such as ringing, edge distortion, and texture corruption. The deblocking filter cannot reduce artifacts caused by quantization errors which appear inside a block. Moreover, the low-pass filtering techniques employed in deblocking assume a smooth image model and are not suited for processing image singularities such as edges or textures.

Recently, studies have been performed relating to the application of sparsity-based denoising approaches to images and videos. Some of these approaches have involved a sparse matrix. A sparse matrix is a matrix populated primarily with zeros.

Relating to the aforementioned studies and, in particular, based on discoveries in neuron-science and image processing, it has been determined that natural images or videos share sparse characteristics which distinguish them from random noise signals. This sparsity characteristic for image and video denoising means that the image and video signals can be sparsely decomposed by some bases. Hence, many algorithms have been developed based on the preceding sparsity characteristic. Many sparsity-based denoising methods typically assume that the true signal can be well approximated by a linear combination of a few basic elements. That is, the signal is sparsely represented in a transform domain. Hence by preserving the few high-magnitude transform coefficients that have a high probability of conveying the true-signal energy and discarding the rest, with the latter having a high percentage and high likelihood of being largely due to noise, the true signal can be effectively estimated.

A sparsity-based denoising operation typically involves the following three basic steps: transform; shrinkage (or thresholding); and inverse transform. One popular approach for exploiting a sparse image model is to use an overcomplete set of linear transforms and a thresholding operation. For example, a first prior art approach referred to as the "k-SVD approach" involves a basis pursuit approach, where the transform bases are trained based on an image or video database by minimizing an energy function.

Different from this basis pursuit approach, other prior art approaches adapt the signal to standard bases instead of pursuing the suitable basis for the signal. For example, in a second prior art approach, a sliding-window transform-domain denoising method is presented, where the basic idea is to apply shrinkage in a local (windowed) transform domain obtained through a standard transform, such as Fast Fourier Transform (FFT) or Discrete Cosine Transform (DCT). The overlap between successive windows accounts for the over-completeness. In a third and a fourth prior art approach, kNN (k nearest neighbors) patch-based denoising approaches are proposed. Instead of using an overlapped spatial neighbor as in the first prior art approach, the third and fourth prior art approaches search the similar d-dimensional region (patch or area) in a non-local adaptive way and then apply a d+1 dimensional transform on the "grouped" regions (patches or areas) followed by similar shrinkage (thresholding) and inverse transform. The final denoised pixel is the weighted average of all estimates of that pixel.

Without losing generality, all the above approaches except for k-SVD can all be thought of as kNN region-based denoising approaches, where for the two dimensional (2D) case, the spatial neighboring patch can be considered as an ad-hoc method to do kNN.

Turning to FIG. 3, the general framework of the kNN region-based sparsity denoising approach is indicated generally by the reference numeral 300. Region (patch or area) clustering is performed on a region cluster 305 based on a similarity criteria or metric in order to "pack" 310 the region cluster 305 and obtain a "packed" region cluster representation 315. The region dimension and size can be 2D or 3D. Then, a selected transform 320 (e.g., FFT or DCT) is applied to the packed region cluster representation 315 to obtain a sparse representation 325 there for. The dimension of transform is dependent on the region and region cluster dimension. In the transform domain, a shrinkage or thresholding operation 330 is often applied to the sparse representation 325 for noise removal to obtain a processed (transform domain) signal 335 representing a post-shrinkage result. Then, an inverse transformation 340 is applied to take the processed (transform domain) signal 335 back to the intensity domain, thus providing a processed (intensity domain) signal 345. Finally, the region cluster is "unpacked" 350 and each region (patch or area) inside is restored to its original location from the processed (intensity domain) signal 345 to obtain an unpacked region cluster 355. Looping is performed over all processing pixel locations and, because of the overlapping of the patches, each pixel can have multiple estimates. Then, these multiple estimates can be fused (combined, sometimes using a weighting algorithm) to obtain the final denoised pixel. For the best denoising effect, the decision of the threshold is very important.

Inspired by the sparsity-based denoising techniques, a nonlinear in-loop filter has been proposed in the literature for compression de-artifacting. This technique uses a set of denoised estimates provided by an over-complete set of transforms. Specifically, the implementation of the second prior art approach generates an over-complete set of transforms by using all possible translations $H_i$ of a given 2D orthonormal transform H, such as wavelets or DCT. Thus, given an image I, a series of different transformed versions $Y_i$ of the image I is created by applying the various transforms $H_i$. Each transformed version $Y_i$ is then subject to a denoising procedure, typically including a thresholding operation, to produce the series of $Y'_i$. The transformed and thresholded coefficients $Y'_i$ are then inverse transformed back into the spatial domain, giving rise to the denoised estimates $I'_i$. In over-complete settings, it is expected that some of the denoised estimates will provide better performance than others and that the final filtered version I' will benefit from a combination via averaging of such denoised estimates. The denoising filter of the second prior art approach uses the weighted average of denoised estimates $I'_i$ where the weights are optimized to emphasize the best denoised estimates. To handle de-artifacting more efficiently and remove the constraint posed by the second prior art approach, a fifth prior art approach proposes exploiting different sub-lattice samplings of the picture to be filtered in order to extend the directions of analysis beyond vertical and horizontal components. Furthermore, the direction-adaptive de-artifacting filter excludes from the weighted combination the denoised estimates originating from transforms which are similar or closely aligned to the transforms used in coding residue.

For de-artifacting, the choice of filtering threshold is of great importance. The applied threshold plays a crucial part in controlling the denoising capacity of the filter as well as in computing the averaging weights used in emphasizing the better denoising estimates. Inadequate threshold selection may result in over-smoothed reconstructed pictures or may allow the persistence of artifacts. The method proposed in a sixth prior art approach improves performance over the fifth prior art approach by adaptively selecting filtering thresholds consistent with quantization noise statistics, local encoding conditions, compression requirements and the original signal. Thresholds are both spatially and temporally adapted to optimize video quality and/or coding cost. In particular, a filtering map is created to handle different threshold classes. Selected thresholds per class are encoded and transmitted as side information to the decoder. However, in practice, the optimal selection of such threshold is not easy. For example, in the sixth prior art approach, an exhaustive search is used to find the best threshold which provides the highest peak signal-to-noise ratio (PSNR).

Finally, spatial Wiener filtering is used in video compression to improve coding quality. For example, in a seventh prior art approach, Wiener filters, which are trained at the encoder based on local spatial variances, are used as a post-filter to remove quantization noise. However, in the seventh prior art approach, the filter coefficients are explicitly sent as overhead in the bitstream, thus increasing transmission overhead.

SUMMARY

These and other drawbacks and disadvantages of the prior art are addressed by the present principles, which are directed to methods and apparatus for sparsity-based de-artifact filtering for video encoding and decoding.

According to an aspect of the present principles, there is provided an apparatus. The apparatus includes an encoder for encoding at least a portion of an image by grouping regions within the portion based on a grouping metric, transforming the grouped regions, adaptively performing de-artifact filtering on the transformed regions using a de-artifacting filter included in the encoder, inverse transforming the de-artifacted regions to create replacement regions, and restoring the replacement regions to positions with the image from which the regions were taken prior to the grouping.

According to another aspect of the present principles, there is provided a method performed in a video encoder. The method includes encoding at least a portion of an image. The encoding step includes: grouping regions within the portion based on a grouping metric; transforming the grouped regions; adaptively performing de-artifact filtering on the transformed regions using a de-artifacting filter; inverse transforming the de-artifacted regions to create replacement regions; and restoring the replacement regions to positions with the image from which the regions were taken prior to the grouping.

According to yet another aspect of the present principles, there is provided an apparatus. The apparatus includes a decoder for decoding at least a portion of an image by grouping regions within the portion based on a grouping metric, transforming the grouped regions, adaptively performing de-artifact filtering on the transformed regions using a de-artifacting filter included in the decoder, inverse transforming the de-artifacted regions to create replacement regions, and restoring the replacement regions to positions with the image from which the regions were taken prior to the grouping.

According to still another aspect of the present principles, there is provided a method performed in a video decoder. The method includes decoding at least a portion of an image. The decoding step includes: grouping regions within the portion based on a grouping metric; transforming the grouped regions; adaptively performing de-artifact filtering on the transformed regions using a de-artifacting filter; inverse transforming the de-artifacted regions to create replacement regions; and restoring the replacement regions to positions with the image from which the regions were taken prior to the grouping.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
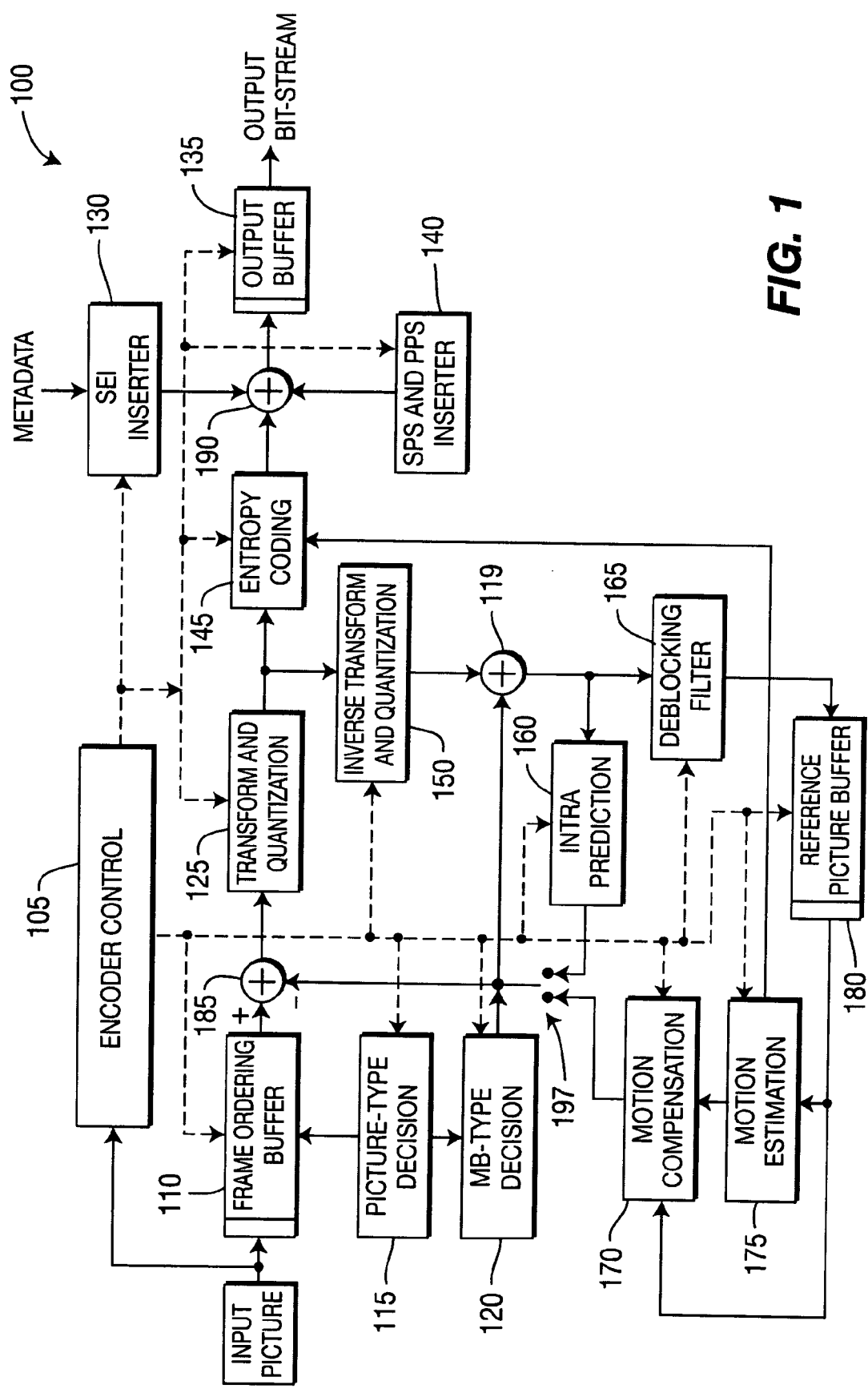
FIG. 1 is a block diagram showing a video encoder capable of performing video encoding in accordance with the MPEG-4 AVC Standard.
Figure 2:
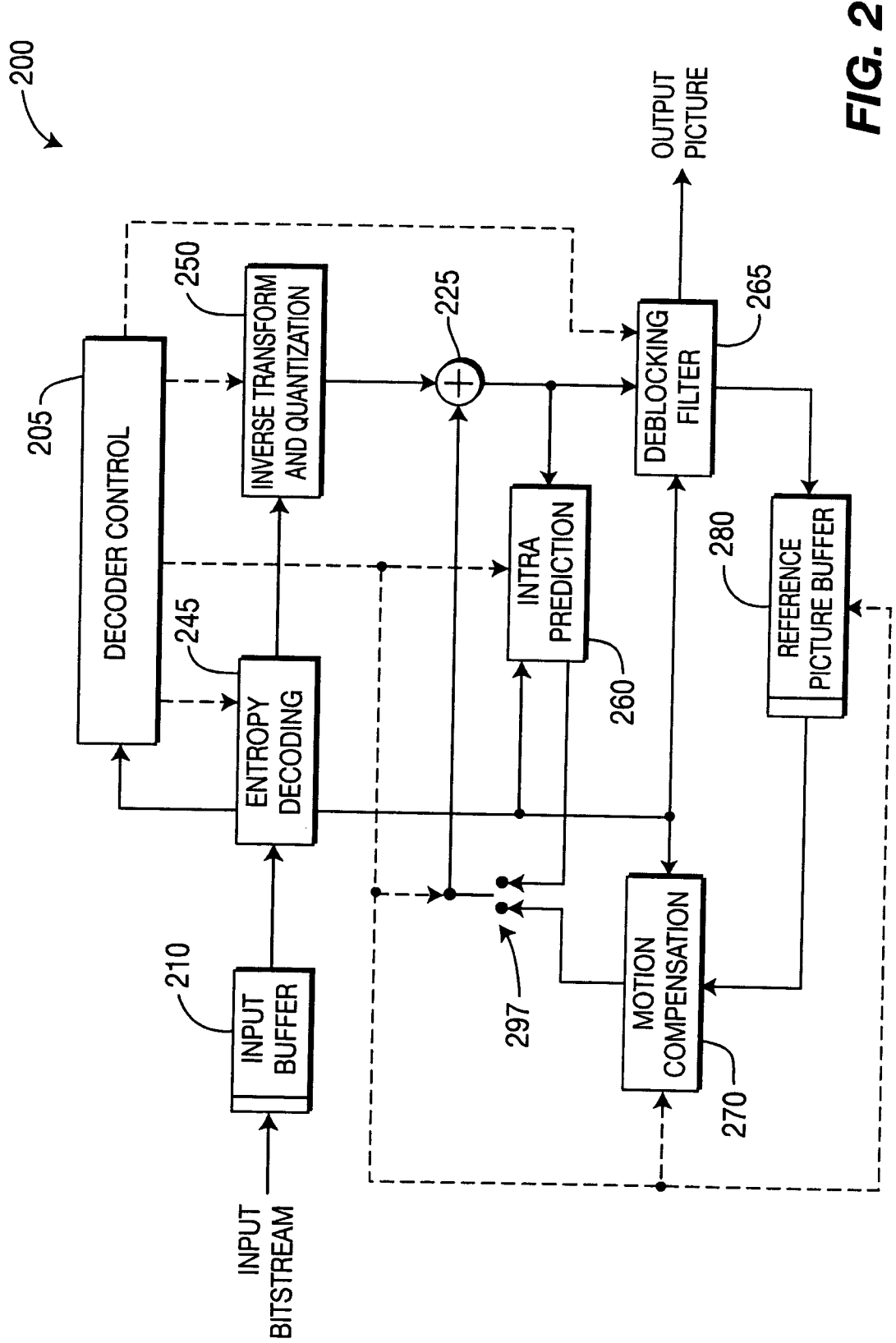
FIG. 2 is a block diagram showing a video decoder capable of performing video decoding in accordance with the MPEG-4 AVC Standard.
Figure 3:
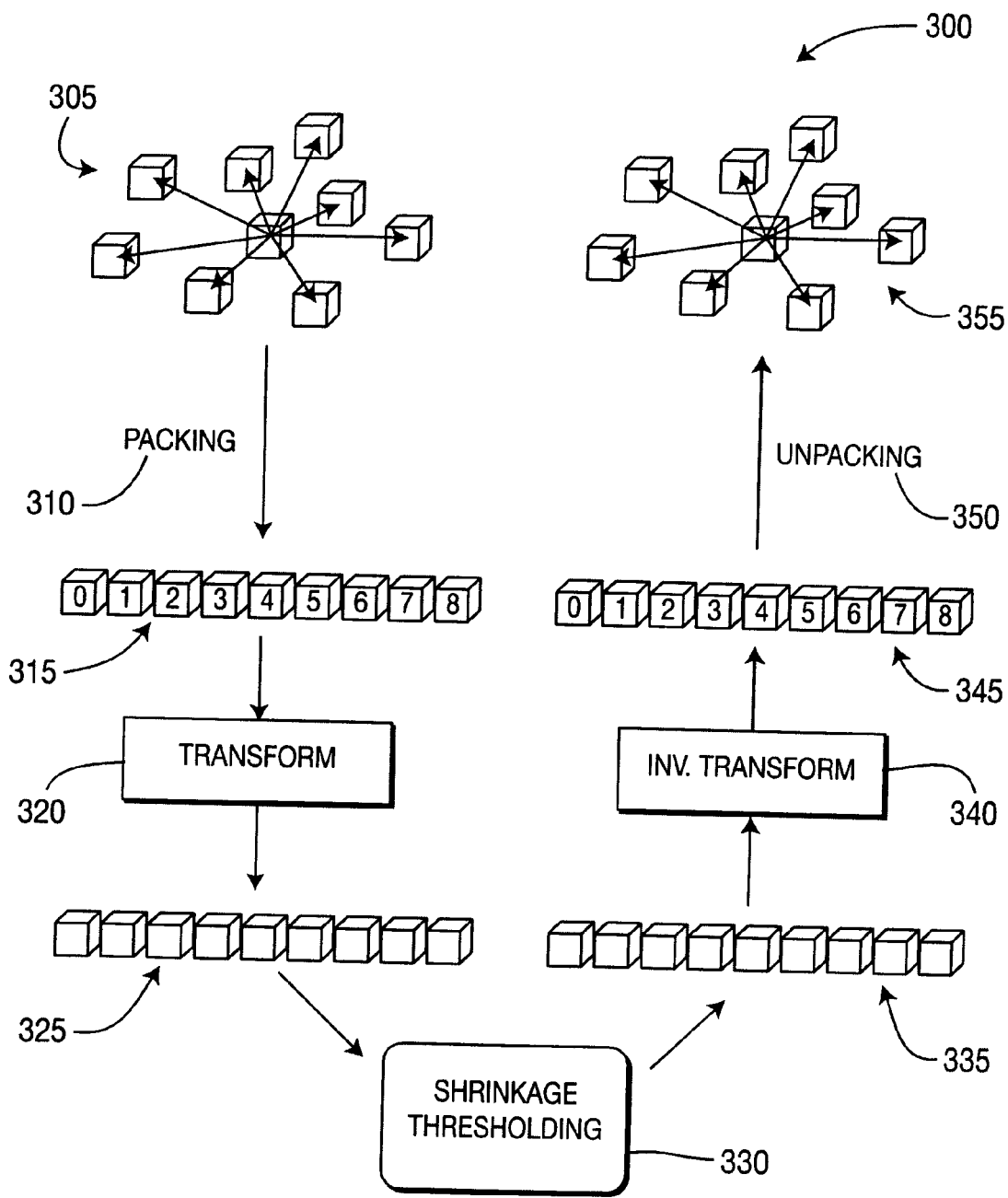
FIG. 3 is a block diagram showing the general framework of the kNN region-based sparsity denoising approach.

The present principles are directed to methods and apparatus for sparsity-based de-artifact filtering for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Further, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Also, as used herein, the words "picture" and "image" are used interchangeably and refer to a still picture or a picture from a video sequence. As is known, a picture may be a frame or a field.

Additionally, as used herein, "out-of-loop" refers to an element whose output would not impact the subsequent encoding or decoding of a particular picture, i.e., since such element would be outside the coding loop. Moreover, as used herein, "in-loop" refers to an element whose output would impact the subsequent encoding or decoding of a particular picture, i.e., since such element would be within the coding loop.

As noted above, the present principles are directed to methods and apparatus for sparsity-based de-artifact filtering for video encoding and decoding.

In an embodiment, a de-artifacting filter in accordance with the present principles may be configured to replace an existing deblocking filter in an encoder and/or decoder.

Figure 4:
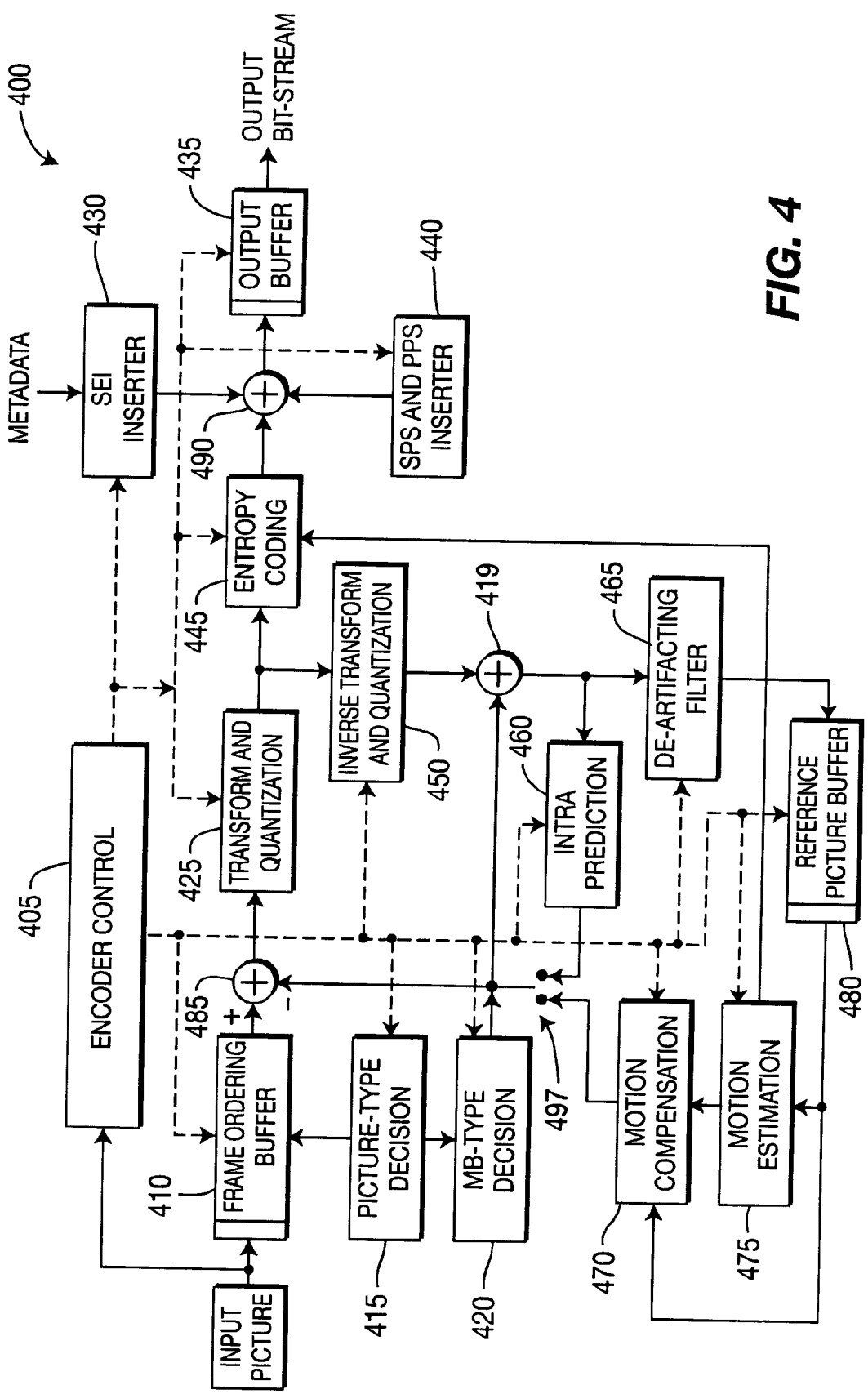
FIG. 4 is a block diagram showing an exemplary video encoder having a de-artifacting filter in place of a deblocking filter, in accordance with an embodiment of the present principles.

Turning to FIG. 4, an exemplary video encoder having a de-artifacting filter in place of a deblocking filter is indicated generally by the reference numeral 400.

The video encoder 400 includes a frame ordering buffer 410 having an output in signal communication with a non-inverting input of a combiner 485. An output of the combiner 485 is connected in signal communication with a first input of a transformer and quantizer 425. An output of the transformer and quantizer 425 is connected in signal communication with a first input of an entropy coder 445 and a first input of an inverse transformer and inverse quantizer 450. An output of the entropy coder 445 is connected in signal communication with a first non-inverting input of a combiner 490. An output of the combiner 490 is connected in signal communication with a first input of an output buffer 435.

A first output of an encoder controller 405 is connected in signal communication with a second input of the frame ordering buffer 410, a second input of the inverse transformer and inverse quantizer 450, an input of a picture-type decision module 415, a first input of a macroblock-type (MB-type) decision module 420, a second input of an intra prediction module 460, a second input of a de-artifacting filter 465, a first input of a motion compensator 470, a first input of a motion estimator 475, and a second input of a reference picture buffer 480.

A second output of the encoder controller 405 is connected in signal communication with a first input of a Supplemental Enhancement Information (SEI) inserter 430, a second input of the transformer and quantizer 425, a second input of the entropy coder 445, a second input of the output buffer 435, and an input of the Sequence Parameter Set (SPS) and Picture Parameter Set (PPS) inserter 440.

An output of the SEI inserter 430 is connected in signal communication with a second non-inverting input of the combiner 490.

A first output of the picture-type decision module 415 is connected in signal communication with a third input of the frame ordering buffer 410. A second output of the picture-type decision module 415 is connected in signal communication with a second input of a macroblock-type decision module 420.

An output of the Sequence Parameter Set (SPS) and Picture Parameter Set (PPS) inserter 440 is connected in signal communication with a third non-inverting input of the combiner 490.

An output of the inverse quantizer and inverse transformer 450 is connected in signal communication with a first non-inverting input of a combiner 419. An output of the combiner 419 is connected in signal communication with a first input of the intra prediction module 460 and a first input of the de-artifacting filter 465. An output of the de-artifacting filter 465 is connected in signal communication with a first input of a reference picture buffer 480. An output of the reference picture buffer 480 is connected in signal communication with a second input of the motion estimator 475 and a third input of the motion compensator 470. A first output of the motion estimator 475 is connected in signal communication with a second input of the motion compensator 470. A second output of the motion estimator 475 is connected in signal communication with a third input of the entropy coder 445.

An output of the motion compensator 470 is connected in signal communication with a first input of a switch 497. An output of the intra prediction module 460 is connected in signal communication with a second input of the switch 497. An output of the macroblock-type decision module 420 is connected in signal communication with a third input of the switch 497. The third input of the switch 497 determines whether or not the "data" input of the switch (as compared to the control input, i.e., the third input) is to be provided by the motion compensator 470 or the intra prediction module 460. The output of the switch 497 is connected in signal communication with a second non-inverting input of the combiner 419 and an inverting input of the combiner 485.

A first input of the frame ordering buffer 410 and an input of the encoder controller 405 are available as inputs of the encoder 400, for receiving an input picture. Moreover, a second input of the Supplemental Enhancement Information (SEI) inserter 430 is available as an input of the encoder 400, for receiving metadata. An output of the output buffer 435 is available as an output of the encoder 400, for outputting a bitstream.

Figure 5:
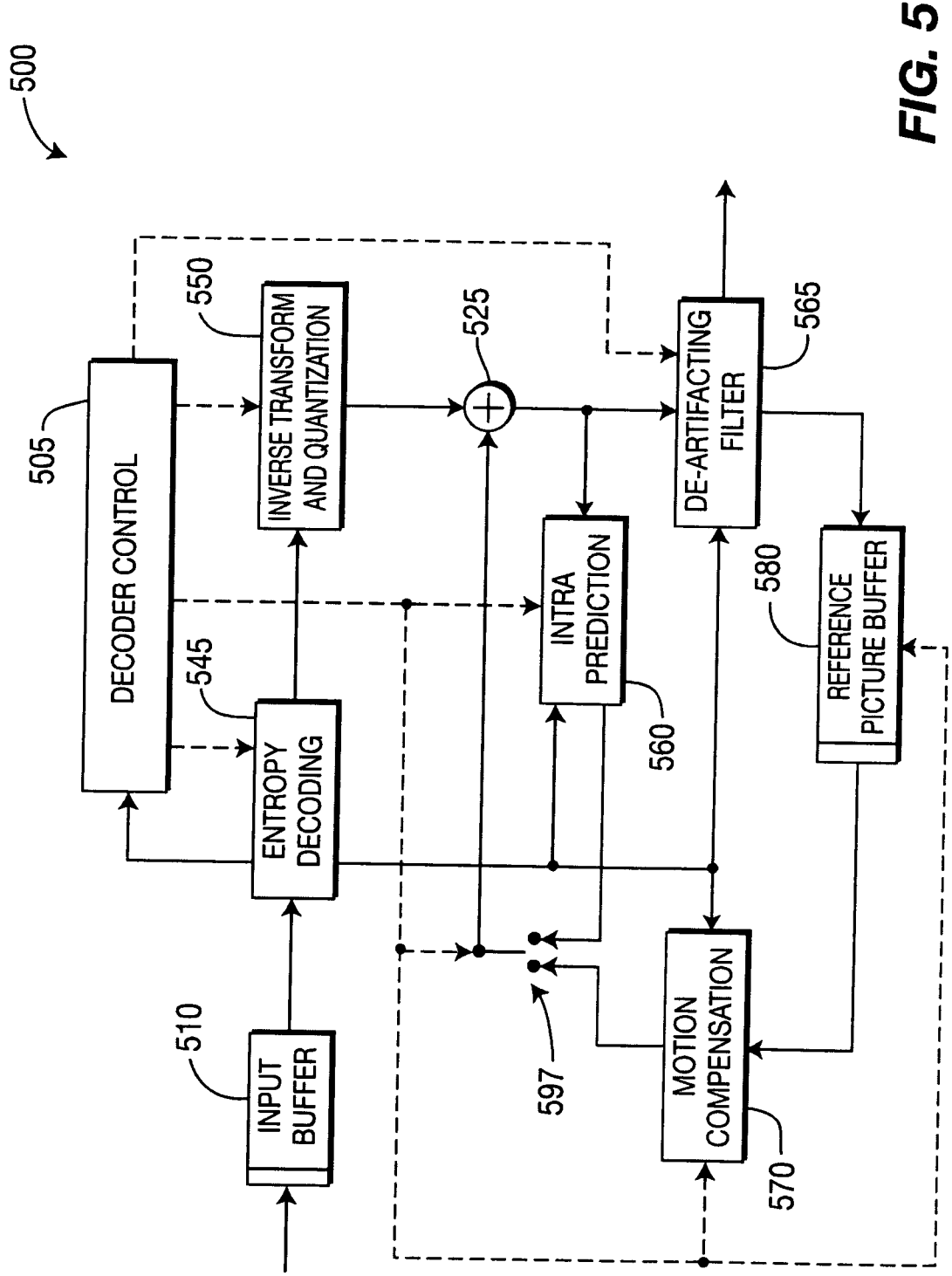
FIG. 5 is a block diagram showing an exemplary video decoder having a de-artifacting filter in place of a deblocking filter, in accordance with an embodiment of the present principles.

Turning to FIG. 5, an exemplary video decoder having a de-artifacting filter in place of a deblocking filter is indicated generally by the reference numeral 500.

The video decoder 500 includes an input buffer 510 having an output connected in signal communication with a first input of the entropy decoder 545. A first output of the entropy decoder 545 is connected in signal communication with a first input of an inverse transformer and inverse quantizer 550. An output of the inverse transformer and inverse quantizer 550 is connected in signal communication with a second non-inverting input of a combiner 525. An output of the combiner 525 is connected in signal communication with a second input of a de-artifacting filter 565 and a first input of an intra prediction module 560. A second output of the de-artifacting filter 565 is connected in signal communication with a first input of a reference picture buffer 580. An output of the reference picture buffer 580 is connected in signal communication with a second input of a motion compensator 570.

A second output of the entropy decoder 545 is connected in signal communication with a third input of the motion compensator 570 and a first input of the de-artifacting filter 565. A third output of the entropy decoder 545 is connected in signal communication with an input of a decoder controller 505. A first output of the decoder controller 505 is connected in signal communication with a second input of the entropy decoder 545. A second output of the decoder controller 505 is connected in signal communication with a second input of the inverse transformer and inverse quantizer 550. A third output of the decoder controller 505 is connected in signal communication with a third input of the de-artifacting filter 565. A fourth output of the decoder controller 505 is connected in signal communication with a second input of the intra prediction module 560, a first input of the motion compensator 570, and a second input of the reference picture buffer 580.

An output of the motion compensator 570 is connected in signal communication with a first input of a switch 597. An output of the intra prediction module 560 is connected in signal communication with a second input of the switch 597. An output of the switch 597 is connected in signal communication with a first non-inverting input of the combiner 525.

An input of the input buffer 510 is available as an input of the decoder 500, for receiving an input bitstream. A first output of the de-artifacting filter 565 is available as an output of the decoder 500, for outputting an output picture.

In an embodiment, a de-artifacting filter in accordance with the present principles may be configured following an existing deblocking filter in an encoder and/or decoder.

Figure 6:
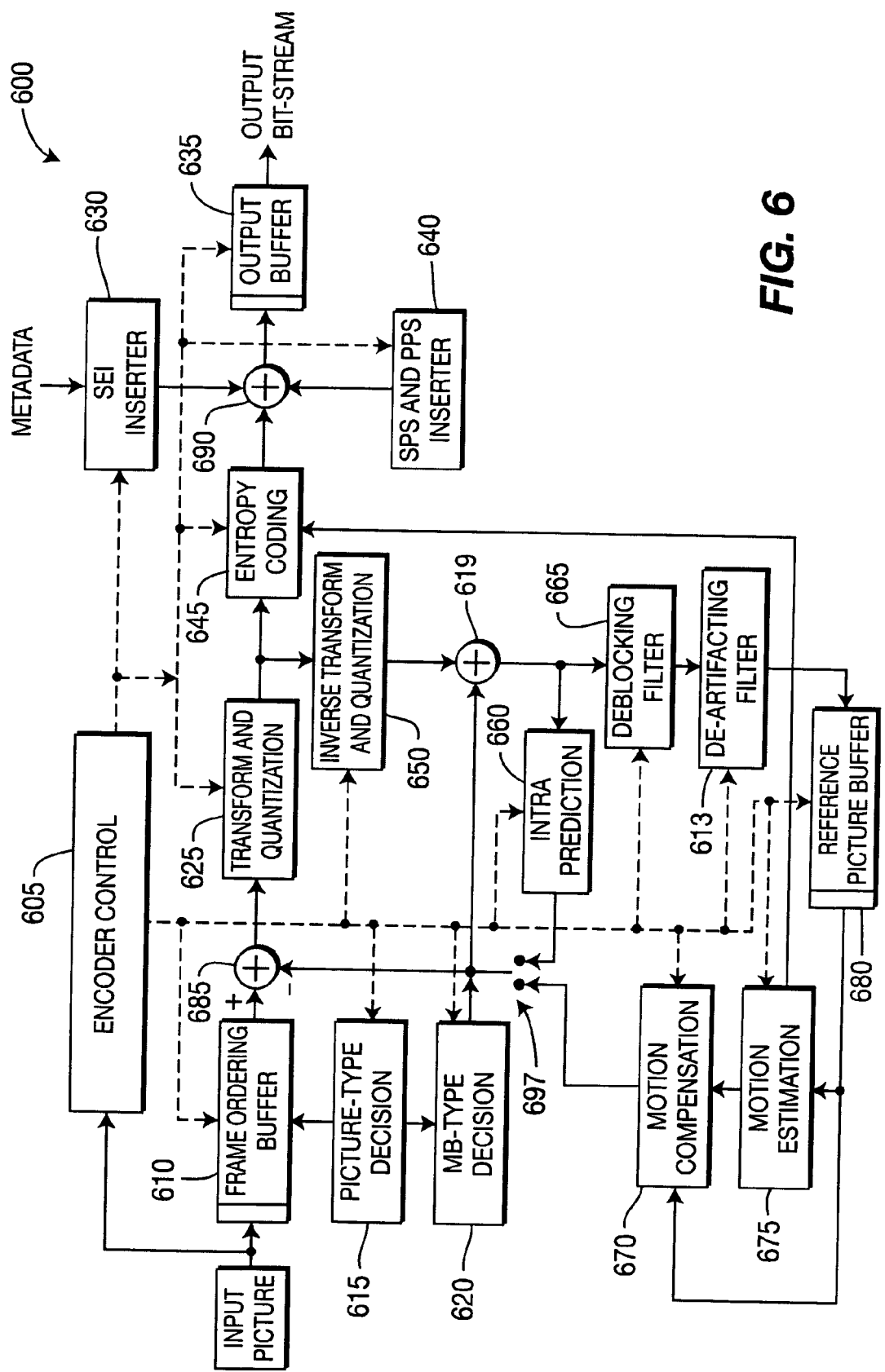
FIG. 6 is a block diagram showing an exemplary video encoder having a de-artifacting filter configured subsequent to a deblocking filter, in accordance with an embodiment of the present principles.

Turning to FIG. 6, an exemplary video encoder having a de-artifacting filter configured subsequent to a deblocking filter is indicated generally by the reference numeral 600.

The video encoder 600 includes a frame ordering buffer 610 having an output in signal communication with a non-inverting input of a combiner 685. An output of the combiner 685 is connected in signal communication with a first input of a transformer and quantizer 625. An output of the transformer and quantizer 625 is connected in signal communication with a first input of an entropy coder 645 and a first input of an inverse transformer and inverse quantizer 650. An output of the entropy coder 645 is connected in signal communication with a first non-inverting input of a combiner 690. An output of the combiner 690 is connected in signal communication with a first input of an output buffer 635.

A first output of an encoder controller 605 is connected in signal communication with a second input of the frame ordering buffer 610, a second input of the inverse transformer and inverse quantizer 650, an input of a picture-type decision module 615, a first input of a macroblock-type (MB-type) decision module 620, a second input of an intra prediction module 660, a second input of a deblocking filter 665, a second input of a de-artifacting filter 613, a first input of a motion compensator 670, a first input of a motion estimator 675, and a second input of a reference picture buffer 680.

A second output of the encoder controller 605 is connected in signal communication with a first input of a Supplemental Enhancement Information (SEI) inserter 630, a second input of the transformer and quantizer 625, a second input of the entropy coder 645, a second input of the output buffer 635, and an input of the Sequence Parameter Set (SPS) and Picture Parameter Set (PPS) inserter 640.

An output of the SEI inserter 630 is connected in signal communication with a second non-inverting input of the combiner 690.

A first output of the picture-type decision module 615 is connected in signal communication with a third input of the frame ordering buffer 610. A second output of the picture-type decision module 615 is connected in signal communication with a second input of a macroblock-type decision module 620.

An output of the Sequence Parameter Set (SPS) and Picture Parameter Set (PPS) inserter 640 is connected in signal communication with a third non-inverting input of the combiner 690.

An output of the inverse quantizer and inverse transformer 650 is connected in signal communication with a first non-inverting input of a combiner 619. An output of the combiner 619 is connected in signal communication with a first input of the intra prediction module 660 and a first input of the deblocking filter 665. An output of the deblocking filter 665 is connected in signal communication with a first input of the de-artifacting filter 613. An output of the de-artifacting filter 613 is connected in signal communication with a first input of a reference picture buffer 680. An output of the reference picture buffer 680 is connected in signal communication with a second input of the motion estimator 675 and a third input of the motion compensator 670. A first output of the motion estimator 675 is connected in signal communication with a second input of the motion compensator 670. A second output of the motion estimator 675 is connected in signal communication with a third input of the entropy coder 645.

An output of the motion compensator 670 is connected in signal communication with a first input of a switch 697. An output of the intra prediction module 660 is connected in signal communication with a second input of the switch 697. An output of the macroblock-type decision module 620 is connected in signal communication with a third input of the switch 697. The third input of the switch 697 determines whether or not the "data" input of the switch (as compared to the control input, i.e., the third input) is to be provided by the motion compensator 670 or the intra prediction module 660. The output of the switch 697 is connected in signal communication with a second non-inverting input of the combiner 619 and an inverting input of the combiner 685.

A first input of the frame ordering buffer 610 and an input of the encoder controller 605 are available as inputs of the encoder 600, for receiving an input picture. Moreover, a second input of the Supplemental Enhancement Information (SEI) inserter 630 is available as an input of the encoder 600, for receiving metadata. An output of the output buffer 635 is available as an output of the encoder 600, for outputting a bitstream.

Figure 7:
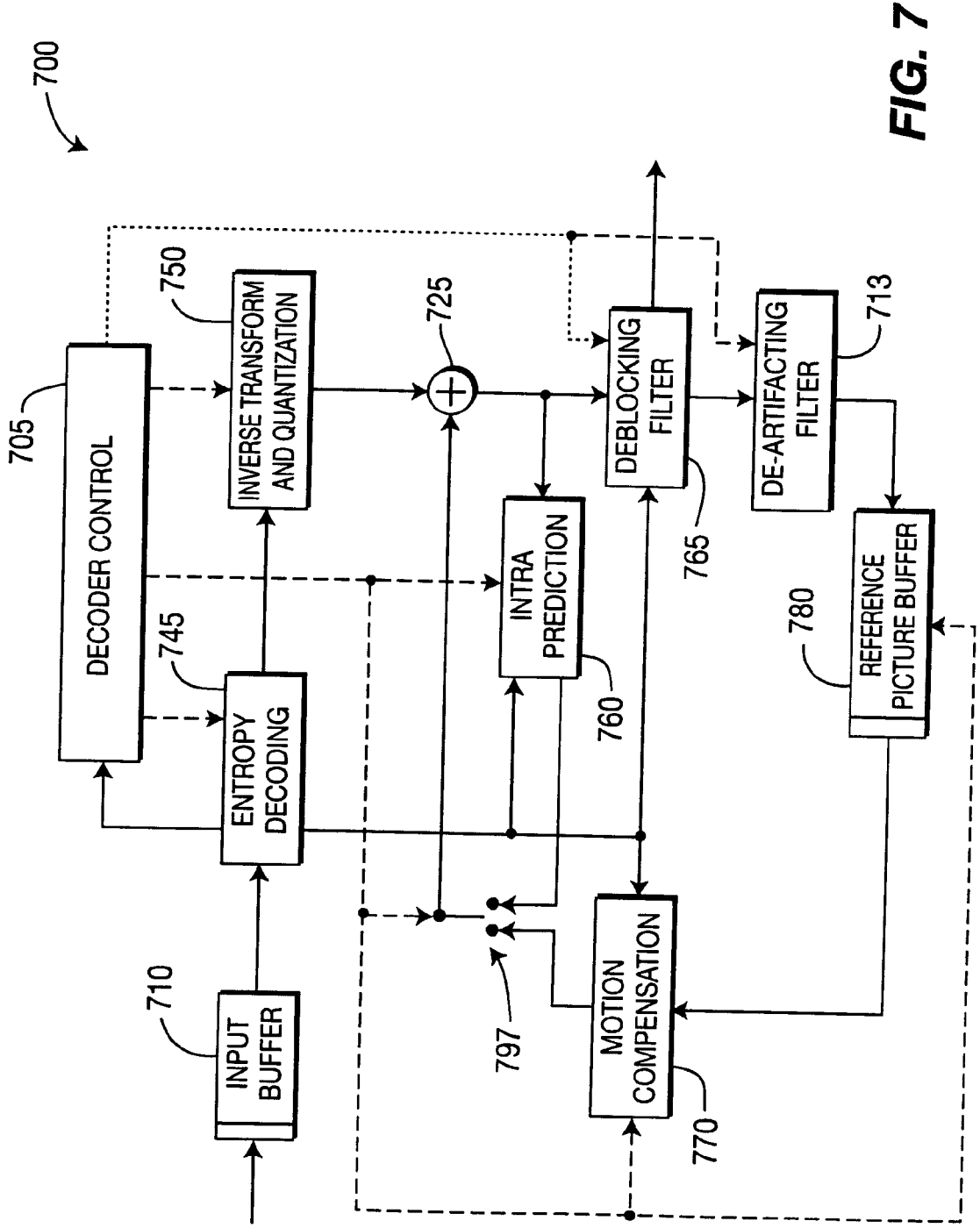
FIG. 7 is a block diagram showing an exemplary video decoder having a de-artifacting filter configured subsequent to a deblocking filter, in accordance with an embodiment of the present principles.

Turning to FIG. 7, an exemplary video decoder encoder having a de-artifacting filter configured subsequent to a deblocking filter is indicated generally by the reference numeral 700.

The video decoder 700 includes an input buffer 710 having an output connected in signal communication with a first input of the entropy decoder 745. A first output of the entropy decoder 745 is connected in signal communication with a first input of an inverse transformer and inverse quantizer 750. An output of the inverse transformer and inverse quantizer 750 is connected in signal communication with a second non-inverting input of a combiner 725. An output of the combiner 725 is connected in signal communication with a second input of a deblocking filter 765 and a first input of an intra prediction module 760. A second output of the deblocking filter 765 is connected in signal communication with a second input of a de-artifacting filter 713. An output of the de-artifacting filter 713 is connected in signal communication with a first input of a reference picture buffer 780. An output of the reference picture buffer 780 is connected in signal communication with a second input of a motion compensator 770.

A second output of the entropy decoder 745 is connected in signal communication with a third input of the motion compensator 770 and a first input of the deblocking filter 765. A third output of the entropy decoder 745 is connected in signal communication with an input of a decoder controller 705. A first output of the decoder controller 705 is connected in signal communication with a second input of the entropy decoder 745. A second output of the decoder controller 705 is connected in signal communication with a second input of the inverse transformer and inverse quantizer 750. A third output of the decoder controller 705 is connected in signal communication with a third input of the deblocking filter 765 and a first input of the de-artifacting filter 713. A fourth output of the decoder controller 705 is connected in signal communication with a second input of the intra prediction module 760, a first input of the motion compensator 770, and a second input of the reference picture buffer 780.

An output of the motion compensator 770 is connected in signal communication with a first input of a switch 797. An output of the intra prediction module 760 is connected in signal communication with a second input of the switch 797. An output of the switch 797 is connected in signal communication with a first non-inverting input of the combiner 725.

An input of the input buffer 710 is available as an input of the decoder 700, for receiving an input bitstream. A first output of the deblocking filter 765 is available as an output of the decoder 700, for outputting an output picture.

In an embodiment, a de-artifacting filter in accordance with the present principles may be configured as a post-processing filter in an encoder and/or decoder.

Figure 8:
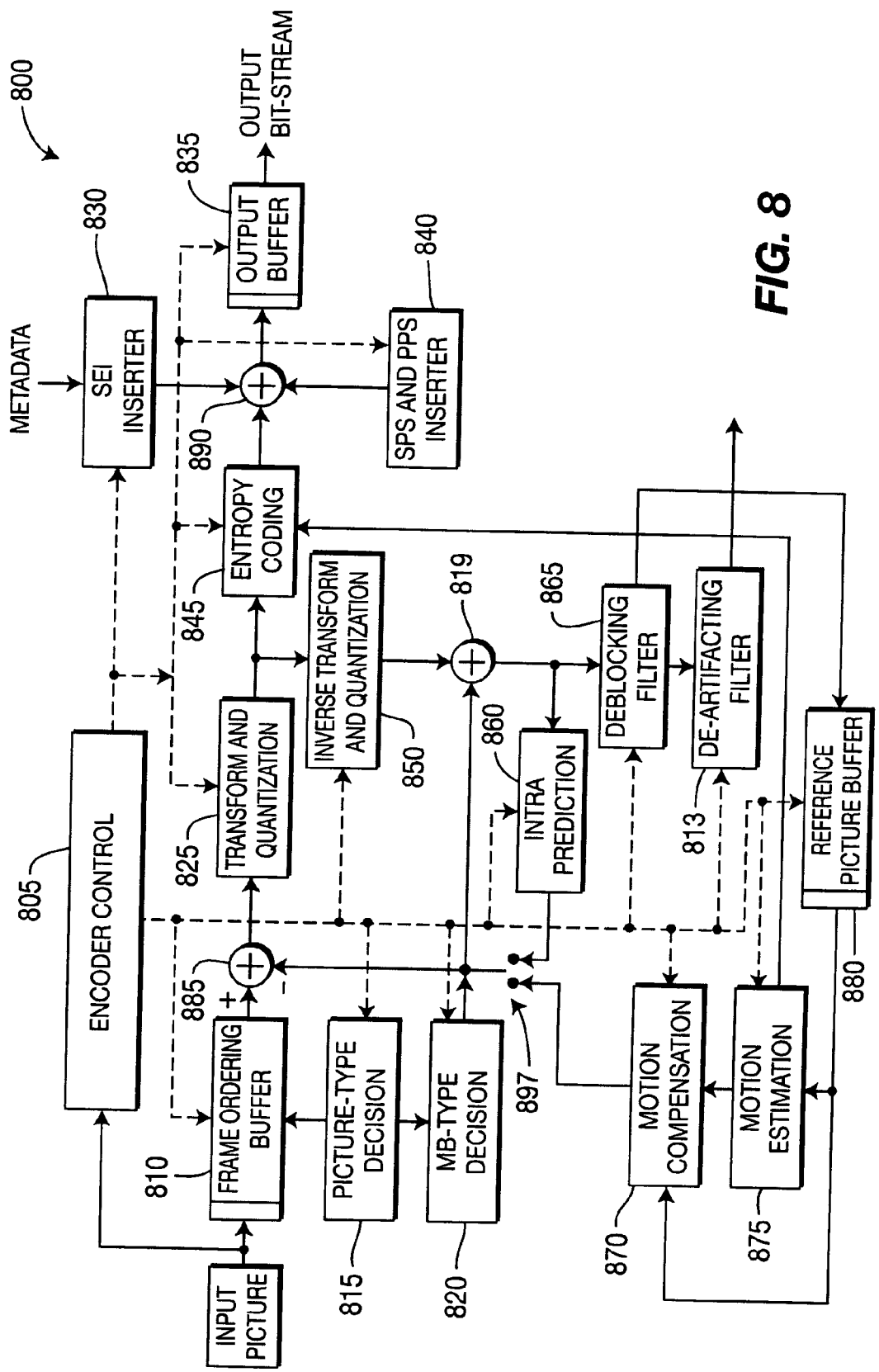
FIG. 8 is a block diagram showing an exemplary video encoder having a de-artifacting filter configured as a post-processing filter, in accordance with an embodiment of the present principles.

Turning to FIG. 8, an exemplary video encoder having a de-artifacting filter configured as a post-processing filter is indicated generally by the reference numeral 800.

The video encoder 800 includes a frame ordering buffer 810 having an output in signal communication with a non-inverting input of a combiner 885. An output of the combiner 885 is connected in signal communication with a first input of a transformer and quantizer 825. An output of the transformer and quantizer 825 is connected in signal communication with a first input of an entropy coder 845 and a first input of an inverse transformer and inverse quantizer 850. An output of the entropy coder 845 is connected in signal communication with a first non-inverting input of a combiner 890. An output of the combiner 890 is connected in signal communication with a first input of an output buffer 835.

A first output of an encoder controller 805 is connected in signal communication with a second input of the frame ordering buffer 810, a second input of the inverse transformer and inverse quantizer 850, an input of a picture-type decision module 815, a first input of a macroblock-type (MB-type) decision module 820, a second input of an intra prediction module 860, a second input of a deblocking filter 865, a second input of a de-artifacting filter 813, a first input of a motion compensator 870, a first input of a motion estimator 875, and a second input of a reference picture buffer 880.

A second output of the encoder controller 805 is connected in signal communication with a first input of a Supplemental Enhancement Information (SEI) inserter 830, a second input of the transformer and quantizer 825, a second input of the entropy coder 845, a second input of the output buffer 835, and an input of the Sequence Parameter Set (SPS) and Picture Parameter Set (PPS) inserter 840.

An output of the SEI inserter 830 is connected in signal communication with a second non-inverting input of the combiner 890.

A first output of the picture-type decision module 815 is connected in signal communication with a third input of the frame ordering buffer 810. A second output of the picture-type decision module 815 is connected in signal communication with a second input of a macroblock-type decision module 820.

An output of the Sequence Parameter Set (SPS) and Picture Parameter Set (PPS) inserter 840 is connected in signal communication with a third non-inverting input of the combiner 890.

An output of the inverse quantizer and inverse transformer 850 is connected in signal communication with a first non-inverting input of a combiner 819. An output of the combiner 819 is connected in signal communication with a first input of the intra prediction module 860 and a first input of the deblocking filter 865. A first output of the deblocking filter 865 is connected in signal communication with a first input of the de-artifacting filter 813. A second output of the deblocking filter 865 is connected in signal communication with a first input of a reference picture buffer 880. An output of the reference picture buffer 880 is connected in signal communication with a second input of the motion estimator 875 and a third input of the motion compensator 870. A first output of the motion estimator 875 is connected in signal communication with a second input of the motion compensator 870. A second output of the motion estimator 875 is connected in signal communication with a third input of the entropy coder 845.

An output of the motion compensator 870 is connected in signal communication with a first input of a switch 897. An output of the intra prediction module 860 is connected in signal communication with a second input of the switch 897. An output of the macroblock-type decision module 820 is connected in signal communication with a third input of the switch 897. The third input of the switch 897 determines whether or not the "data" input of the switch (as compared to the control input, i.e., the third input) is to be provided by the motion compensator 870 or the intra prediction module 860. The output of the switch 897 is connected in signal communication with a second non-inverting input of the combiner 819 and an inverting input of the combiner 885.

A first input of the frame ordering buffer 810 and an input of the encoder controller 805 are available as inputs of the encoder 800, for receiving an input picture. Moreover, a second input of the Supplemental Enhancement Information (SEI) inserter 830 is available as an input of the encoder 800, for receiving metadata. An output of the output buffer 835 and an output of the de-artifacting filter 813 are each available as outputs of the encoder 800, for outputting a bitstream.

Figure 9:
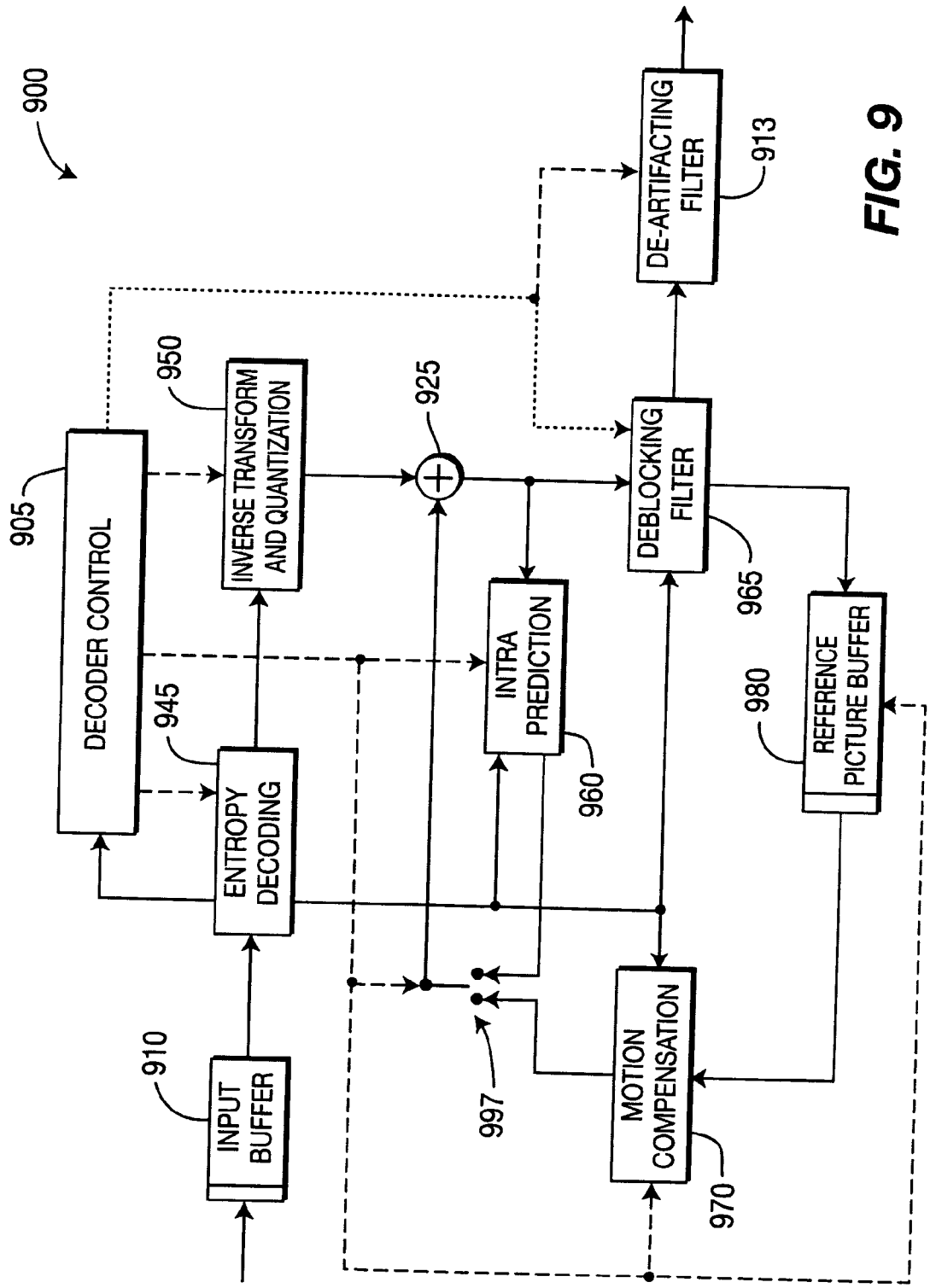
FIG. 9 is a block diagram showing an exemplary video decoder having a de-artifacting filter configured as a post-processing filter, in accordance with an embodiment of the present principles.

Turning to FIG. 9, another exemplary video decoder having a de-artifacting filter configured as a post-processing filter is indicated generally by the reference numeral 900.

The video decoder 900 includes an input buffer 910 having an output connected in signal communication with a first input of the entropy decoder 945. A first output of the entropy decoder 945 is connected in signal communication with a first input of an inverse transformer and inverse quantizer 950. An output of the inverse transformer and inverse quantizer 950 is connected in signal communication with a second non-inverting input of a combiner 925. An output of the combiner 925 is connected in signal communication with a second input of a deblocking filter 965 and a first input of an intra prediction module 960. A second output of the deblocking filter 965 is connected in signal communication with a second input of a de-artifacting filter 913. A first output of the deblocking filter 965 is connected in signal communication with a first input of a reference picture buffer 980. An output of the reference picture buffer 980 is connected in signal communication with a second input of a motion compensator 970.

A second output of the entropy decoder 945 is connected in signal communication with a third input of the motion compensator 970 and a first input of the deblocking filter 965. A third output of the entropy decoder 945 is connected in signal communication with an input of a decoder controller 905. A first output of the decoder controller 905 is connected in signal communication with a second input of the entropy decoder 945. A second output of the decoder controller 905 is connected in signal communication with a second input of the inverse transformer and inverse quantizer 950. A third output of the decoder controller 905 is connected in signal communication with a third input of the deblocking filter 965 and a first input of the de-artifacting filter 913. A fourth output of the decoder controller 905 is connected in signal communication with a second input of the intra prediction module 960, a first input of the motion compensator 970, and a second input of the reference picture buffer 980.

An output of the motion compensator 970 is connected in signal communication with a first input of a switch 997. An output of the intra prediction module 960 is connected in signal communication with a second input of the switch 997. An output of the switch 997 is connected in signal communication with a first non-inverting input of the combiner 925.

An input of the input buffer 910 is available as an input of the decoder 900, for receiving an input bitstream. A first output of the deblocking filter 965 is available as an output of the decoder 900, for outputting an output picture.

Thus, in accordance with the present principles, embodiments are described herein relating to a new de-artifacting framework in which a sparsity-based denoising approach is utilized. In various embodiments, the de-artifacting may involve a de-artifacting filter that replaces an existing deblocking filter (FIGS. 4 and 5), that is configured subsequent to an existing deblocking filter (FIGS. 6 and 7), and that is configured as a post-processing filter (FIGS. 8 and 9).

In an embodiment, the new de-artifacting framework is implemented in the transform domain, where de-artifact filtering is adaptively selected and applied. In a preferred embodiment, a transform domain Wiener filter is used. We call this methodology a region-based sparsity de-artifacting framework, using adaptive filtering in the transform domain. One significant advantage of the present principles is that the required overhead is very small. Compared to previous approaches, we do not need to search thresholds (as was required by the sixth prior art approach) and additionally, we do not need to send Wiener filter coefficients (as was required by the seventh prior art approach). Various embodiments are illustrated and described, which are differentiated by transform dimensions, for example. The present principles are aimed at reducing quantization artifacts presented in video compression, and improving both the objective and subjective performance in video compression encoders and decoders.

In an embodiment, we propose a region (or patch or area) based sparsity de-artifacting framework, with adaptive filtering utilized in the transform domain. The framework is divided into two stages. In the first stage, we decompose (transform) the overlapped regions (patches, areas) of the video signal into the frequency domain by transforms based on the region dimensions, such as 2D, 3D or 4D transforms. In a preferred embodiment, a transform-domain Wiener filter is then applied to the noisy transform coefficients, followed by an inverse transform. After that, all the processed regions are restored to their original positions. In another embodiment, multiple estimates of the same pixel are obtained due to region overlapping. In the second stage, for each pixel, adaptive sparsity-based filtering is used to fuse (or otherwise combine or weight) multiple estimates from the redundant representations of the signal. The de-artifacting framework also needs to take video coding (or quantization) statistics into account.

In one embodiment, the overlapped patch is achieved by a sliding window. In another embodiment, the overlapped patch is achieved by a kNN non-local search. The search can be within the current picture or spatial-temporal neighboring pictures. The dimensions of the patch can be 2D or 3D, and so forth. As is well-known in the art of video compression, 2-D refers to the spatial dimensions of a picture, frame, slice, and so forth. 3-D additionally adds the temporal element for consideration between more than one temporal picture, slice, or frame. The applied transform(s) can be 2D, 3D, 4D, and so forth, based on the dimensions of the region, patch, or area, and on the characteristics of the region, patch, or area. The fourth dimension element comes about due to the added dimension of the grouping of the regions, patches, or areas. In one embodiment, we can use 2D/3D/4D DCT. In another embodiment, we can use 2D/3D/4D FFT. Moreover, it is to be appreciated that the present principles are not limited to any particular transform, such as, for example, FFT or DCT and, thus, any other transforms can be applied too, such as wavelet transforms, while maintaining the spirit of the present principles.

For the embodiment utilizing a Wiener filter, it is implemented as an element-by-element multiplication in transform domain as in the following equation, where $\lambda$ is the coefficient in transform domain and $\hat{\sigma}_n$ is estimated noise of reconstructed pixels, $\Lambda(\lambda)$ is filtered coefficient of $\lambda$:

$$\Lambda(\lambda) = \lambda \frac{\max(\lambda^2 - \hat{\sigma}_n^2, 0)}{\max(\lambda^2 - \hat{\sigma}_n^2, 0) + \hat{\sigma}_n^2}$$

In the above formula, only $\hat{\sigma}_n$ is an unknown element. $\hat{\sigma}_n$ is computed as the standard deviation of the difference between the original signal and the reconstructed signal. In one embodiment, $\hat{\sigma}_n$ is computed using the mean of absolute difference (MAD). $\hat{\sigma}_n$ can be coded as a high/macroblock level syntax and sent to the decoder. In one embodiment, $\hat{\sigma}_n$ is sent as a high level syntax such as, for example, in a network abstraction layer (NAL) unit header, a sequence parameter set (SPS), a picture parameter set (PPS), view parameter set (VPS), slice header, and so forth. In another embodiment, $\hat{\sigma}_n$ is coded in the macroblock level as overhead. It is to be appreciated that while one or more embodiments described herein use a Wiener filter, the present principles are not limited solely to Wiener filters and, thus any other filter that can be applied in an adaptive manner based on some performance metric or parameter can be used in accordance with the present principles, while maintaining the spirit of the present principles.

For the fusion in the second stage, in one embodiment, the weight is approximated as the number of non-zero coefficients in the transform or other sparsity related values. In another embodiment, simple averaging can be used. Of course, the present principles are not limited to the preceding approaches with respect to the second state and, thus, other approaches may also be used in the second stage, while maintaining the spirit of the present principles.

The de-artifacting filter needs to take into consideration the characteristics of quantization noise statistics, coding modes and motion information, local coding conditions, compression requirements, and the original signal. The filters are both spatially and temporally adapted to optimize video quality and/or coding cost. In one embodiment, to avoid an over-smoothing effect, we do not filter pixels in certain conditions, such as in SKIP mode or DIRECT mode, or for blocks without a residue that have a small motion difference with respect to neighboring blocks. In another embodiment, if the above filter is not strong enough to remove all artifacts, a secondary filter is implemented before or after the de-artifacting filter. The secondary filter may be, for example, but is not limited to, a lowpass filter or a second round of de-artifacting filter. Moreover, in an embodiment, the secondary filter may be applied for intra macroblocks after de-artifact filtering.

As noted above, the de-artifacting filter in accordance with the present principles can be used in different kinds of coding diagrams. In one embodiment, it can be used as an out-of-loop filter (i.e., a post-filter, as shown in FIGS. 8 and 9). In another embodiment, it can be used as an in-loop filter, either replacing the deblocking filter in the MPEG-4 AVC encoder and/or decoder (as shown in FIGS. 4 and 5), or can be applied together with deblocking filtering (as shown in FIGS. 6 and 7).

Exemplary slice header syntax corresponding to one or more embodiments of the present principles is shown as TABLE 1.

TABLE 1

| Slice_header( ){ | C | Descriptor |
|---|---|---|
| ... | | |
| Deart_filter_present_flag | 2 | u(1) |
| if(deart_filter_present_flag){ | | |
| filter_selection_type | 2 | u(2) |
| noise_power | 2 | u(10) |
| } | | |
| ... | | |
| } | | |

The semantics of some of the syntax elements in TABLE 1 are as follows:

deart_filter_present_flag equal to 1 specifies that a set of syntax elements controlling the characteristics of the de-artifacting filter is present in the slice header. deart_filter_present_flag equal to 0 specifies that a set of syntax elements controlling the characteristics of the de-artifacting filter is not present in the slice header and their inferred values are not in effect.

filter_selection_type specifies the filter configuration used in de-artifacting. filter_selection_type equal to 0 specifies that direction-adaptive de-artifact filtering shall be disabled. filter_selection_type equal to 1 specifies that out-of-loop de-artifact filtering is used. filter_selection_type equal to 2 specifies that in-loop de-artifact filtering without deblocking filter is used. filter_selection_type equal to 3 specifies that in-loop de-artifact filtering with deblocking filtering is used.

noise_power specifies the value of noise power used for the Wiener filter.

Figure 10:
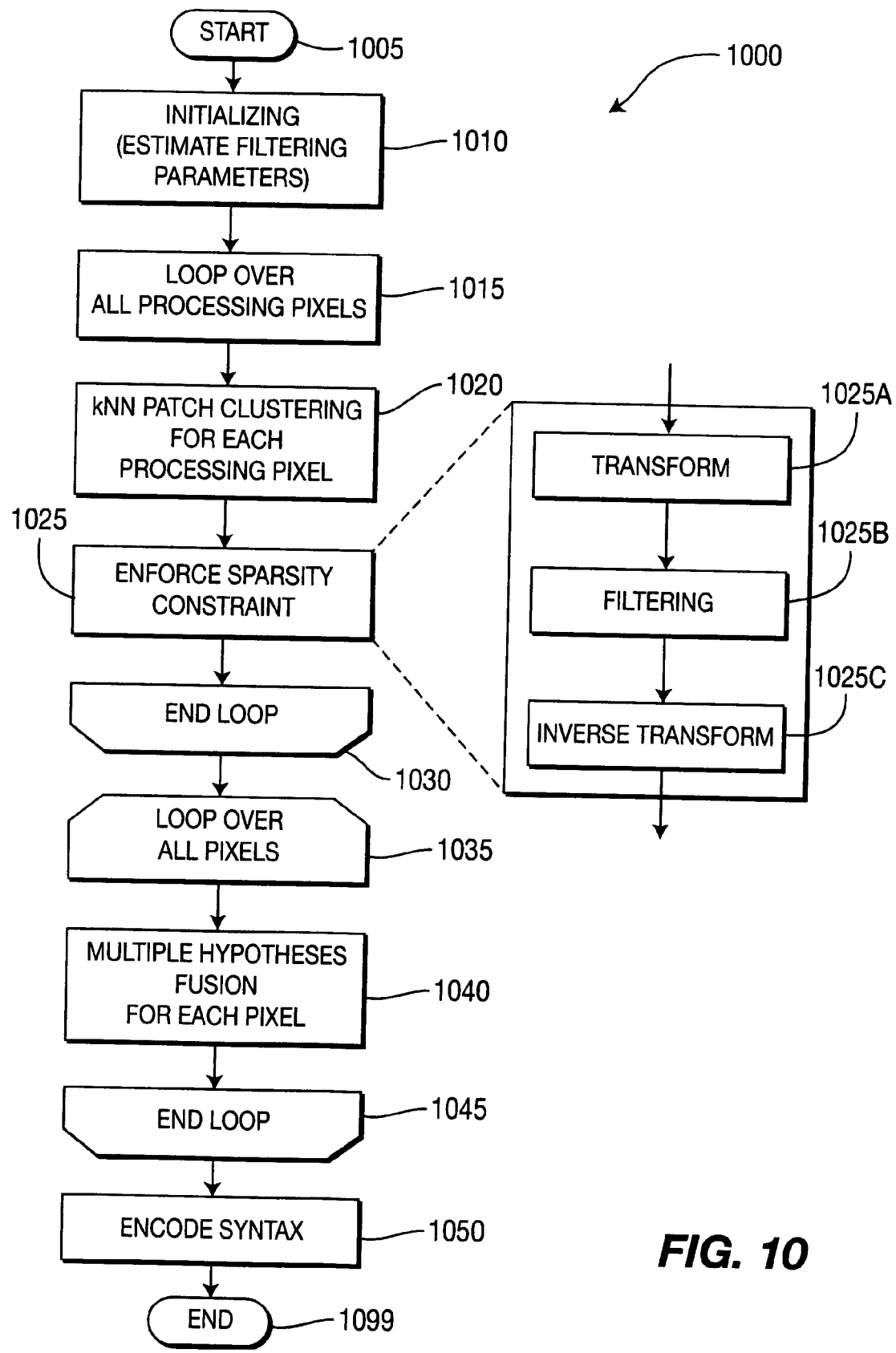
FIG. 10 is a flow diagram showing an exemplary method for sparsity-based de-artifact filtering performed at an encoder, in accordance with an embodiment of the present principles.

Turning to FIG. 10, an exemplary method for sparsity-based de-artifact filtering performed at an encoder is indicated generally by the reference numeral 1000. The method 1000 includes a start block 1005 that passes control to a function block 1010. The function block 1010 performs initialization (which, in an embodiment, involves estimating filtering parameters), and passes control to a loop limit block 1015. The loop limit block begins a loop over all processing pixels, and passes control to a function block 1020. The function block 1020 performs kNN patch clustering for each processing pixel, and passes control to a function block 1025. The function block 1025 enforces a sparsity constraint, and passes control to a loop limit block 1030. The loop limit block 1030 ends the loop over all the processing pixels, and passes control to a loop limit block 1035. The loop limit block 835 begins a loop over all processing pixels, and passes control to a function block 1040. The function block 1040 generates multiple hypotheses fusion for each pixel, and passes control to a loop limit block 1045. The loop limit block 1045 ends the loop over all pixels, and passes control to a function block 1050. The function block 850 encodes syntax, and passes control to an end block 1099.

The function block 1025 involves function blocks 1025A, 1025B, and 1025C. The function block 1025A performs a transform, and passes control to the function block 1025B. The function block 1025B performs filtering, and passes control to the function block 1025C. The function block 1025C performs an inverse transform.

The processing pixels at least referenced with respect to method 1000 may be less than all of the pixels of a picture, region, block, and so forth, since not all pixels need to be processed to reduce complexity given the overlapping regions commonly present in video.

Figure 11:
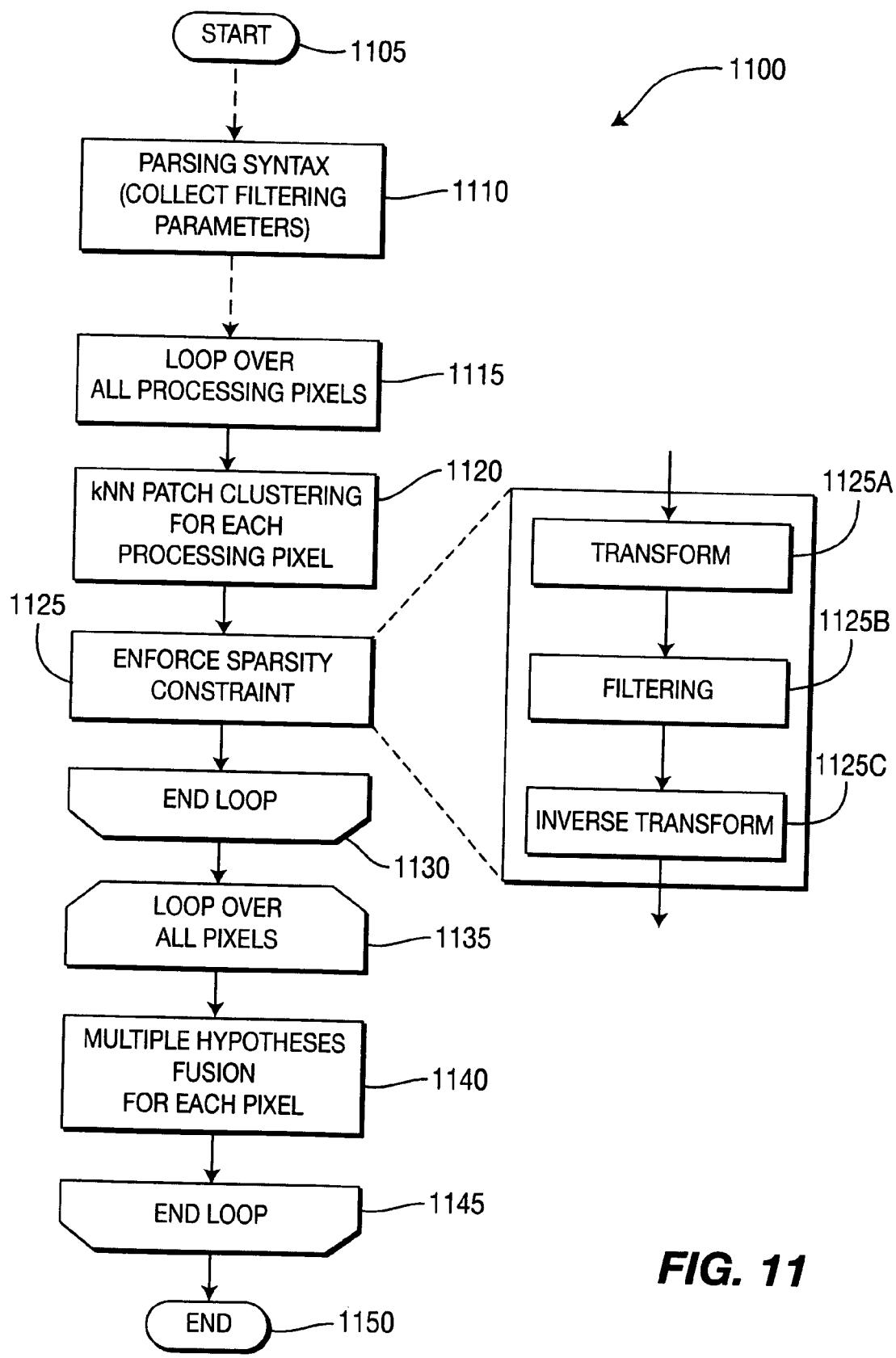
FIG. 11 is a flow diagram showing an exemplary method for sparsity-based de-artifact filtering performed at a decoder, in accordance with an embodiment of the present principles.

Turning to FIG. 11, an exemplary method for sparsity-based de-artifact filtering performed at a decoder is indicated generally by the reference numeral 1100. The method 1100 includes a start block 1105 that passes control to a function block 1110. The function block 1110 parses syntax (to, for example, collect filtering parameters), and passes control to a loop limit block 1115. The loop limit block 1115 begins a loop over all processing pixels, and passes control to a function block 1120. The function block 1120 performs kNN patch clustering for each processing pixel, and passes control to a function block 1125. The function block 1125 enforces a sparsity constraint, and passes control to a loop limit block 1130. The loop limit block 1130 ends the loop over all processing pixels, and passes control to a loop limit block 1135. The loop limit block 1135 begins a loop over all pixels, and passes control to a function block 1140. The function block 1140 performs multiple hypotheses fusion for each pixel, and passes control to a loop limit block 945. The loop limit block 1145 ends the loop over all pixels, and passes control to an end block 1199.

The function block 1125 involves function blocks 1125A, 1195B, and 1125C. The function block 1125A performs a transform, and passes control to the function block 1125B. The function block 1125B performs filtering, and passes control to the function block 1125C. The function block 1125C performs an inverse transform.

A description will now be given of some of the many attendant advantages/features of the present invention, some of which have been mentioned above. For example, one advantage/feature is an apparatus having an encoder for encoding at least a portion of an image by grouping regions within the portion based on a grouping metric, transforming the grouped regions, adaptively performing de-artifact filtering on the transformed regions using a de-artifacting filter included in the encoder, inverse transforming the de-artifacted regions to create replacement regions, and restoring the replacement regions to positions with the image from which the regions were taken prior to the grouping.

Another advantage/feature is the apparatus having the encoder as described above, wherein the de-artifacting filter is configurable for use in any of an in-loop configuration and an out-of-loop configuration.

Yet another advantage/feature is the apparatus having the encoder wherein the de-artifacting filter is configurable for use in any of an in-loop configuration and an out-of-loop configuration as described above, wherein the de-artifacting filter replaces a deblocking filter when the de-artifacting filter is applied the in-loop configuration.

Still another advantage/feature is the apparatus having the encoder wherein the de-artifacting filter is configurable for use in any of an in-loop configuration and an out-of-loop configuration as described above, wherein the encoder includes a deblocking filter, and the de-artifacting filter is configured for use subsequent to the deblocking filter.

Moreover, another advantage/feature is the apparatus having the encoder as described above, wherein the regions of the image correspond to two or more dimensions.

Further, another advantage/feature is the apparatus having the encoder as described above, wherein the grouped regions are transformed using a transform capable of operating in two or more dimensions.

Also, another advantage/feature is the apparatus having the encoder as described above, wherein the de-artifacting filter is a Wiener filter.

Additionally, another advantage/feature is the apparatus having the encoder as described above, wherein the replacement regions are combined using weights prior to restoring.

Moreover, another advantage/feature is the apparatus having the encoder wherein the replacement regions are combined using weights prior to restoring as described above, wherein the grouped regions are transformed to obtain transform sparsity values there for, and the weights are determined responsive to the transform sparsity values.

Further, another advantage/feature is the apparatus having the encoder as described above, wherein at least one of a type and a strength of the de-artifact filtering is adaptively selected responsive to at least one of a quantization noise metric, a coding mode metric, a motion information metric, a local coding condition metric, and a compression requirements metric.

Also, another advantage/feature is the apparatus having the encoder as described above, wherein a secondary filter is applied before or after the de-artifacting filter.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder encoding at least a portion of an image using de-artifact filtering, said encoder comprising a de-artifacting filter that performs the de-artifact filtering by grouping regions within the portion based on dimensions and characteristics of the region or portion, transforming the grouped regions, adaptively performing the de-artifact filtering on the transformed regions, inverse transforming the de-artifacted regions to create replacement regions, and restoring the replacement regions to positions with the image from which the regions were taken prior to the grouping, wherein multiple estimates of the same pixel are obtained from overlapping regions and, for each pixel, adaptive sparsity-based filtering is used to fuse multiple estimates from redundant representations of the overlapping regions, and wherein a type and a strength of the de-artifact filtering is adaptively selected responsive to characteristics of at least one of quantization noise statistics, coding modes and motion information, local coding conditions, and compression requirements.

2. The apparatus of claim 1, wherein the de-artifacting filter is useable in any of an in-loop configuration and an out-of-loop configuration.

3. The apparatus of claim 2, wherein the de-artifacting filter replaces a deblocking filter when said de-artifacting filter is applied the in-loop configuration.

4. The apparatus of claim 2, wherein the encoder includes a deblocking filter, and said de-artifacting filter is configured for use subsequent to the deblocking filter.

5. The apparatus of claim 1, wherein the de-artifacting filter is a Wiener filter.

6. The apparatus of claim 1, wherein the replacement regions are combined using weights prior to restoring.

7. The apparatus of claim 6, wherein the grouped regions are transformed to obtain transform sparsity values there for, and the weights are determined responsive to the transform sparsity values.

8. A method performed in a video encoder, comprising:
encoding at least a portion of an image using de-artifact filtering,
wherein said de-artifact filtering comprises:
grouping regions within the portion based on dimensions and characteristics of the region or portion;
transforming the grouped regions;
adaptively performing de-artifact filtering on the transformed regions using a de-artifacting filter;
inverse transforming the de-artifacted regions to create replacement regions; and
restoring the replacement regions to positions with the image from which the regions were taken prior to the grouping, wherein multiple estimates of the same pixel are obtained from overlapping regions and, for each pixel, adaptive sparsity-based filtering is used to fuse multiple estimates from redundant representations of the overlapping regions, and,
wherein a type and a strength of the de-artifact filtering is adaptively selected responsive to characteristics of at least one of quantization noise statistics, coding modes and motion information, local coding conditions, and compression requirements.

9. The method of claim 8, further comprising configuring the de-artifacting filter for use in any of an in-loop configuration and an out-of-loop configuration.

10. The method of claim 9, further comprising replacing a deblocking filter with the de-artifacting filter when the de-artifacting filter is applied the in-loop configuration.

11. The method of claim 9, wherein the encoder includes a deblocking filter, and the method further comprises configuring the de-artifacting filter for use subsequent to the deblocking filter.

12. The method of claim 8, further comprising combining the replacement regions using weights prior to said restoring step.

13. The method of claim 12, wherein the grouped regions are transformed to obtain transform sparsity values there for, and the weights are determined responsive to the transform sparsity values.

14. The method of claim 8, further comprising applying a secondary filter before or after the de-artifacting filter.

15. An apparatus, comprising:
a decoder decoding at least a portion of an image using de-artifact filtering, said decoder comprising a de-artifact filter for performing the de-artifact filtering by grouping regions within the portion based on dimensions and characteristics of the region or portion, transforming the grouped regions, adaptively performing the de-artifact filtering on the transformed regions, inverse transforming the de-artifacted regions to create replacement regions, and restoring the replacement regions to positions with the image from which the regions were taken prior to the grouping, wherein multiple estimates of the same pixel are obtained from overlapping regions and, for each pixel, adaptive sparsity-based filtering is used to fuse multiple estimates from redundant representations of the overlapping regions, and,
wherein a type and a strength of the de-artifact filtering is adaptively selected responsive to characteristics of at least one of quantization noise statistics, coding modes and motion information, local coding conditions, and compression requirements.

16. The apparatus of claim 15, wherein the de-artifacting filter is useable in any of an in-loop configuration and an out-of-loop configuration.

17. The apparatus of claim 16, wherein the de-artifacting filter replaces a deblocking filter when said de-artifacting filter is applied the in-loop configuration.

18. The apparatus of claim 16, wherein the decoder includes a deblocking filter, and said de-artifacting filter is configured for use subsequent to the deblocking filter.

19. The apparatus of claim 15, wherein the de-artifacting filter is a Wiener filter.

20. The apparatus of claim 15, wherein the replacement regions are combined using weights prior to restoring.

21. The apparatus of claim 20, wherein the grouped regions are transformed to obtain transform sparsity values there for, and the weights are determined responsive to the transform sparsity values.

22. A method performed in a video decoder, comprising:
decoding at least a portion of an image using de-artifact filtering,
wherein said de-artifact filtering comprises:
grouping regions within the portion based on dimensions and characteristics of the region or portion;
transforming the grouped regions;
adaptively performing the de-artifact filtering on the transformed regions using a de-artifacting filter;
inverse transforming the de-artifacted regions to create replacement regions; and
restoring the replacement regions to positions with the image from which the regions were taken prior to the grouping, wherein multiple estimates of the same pixel are obtained from overlapping regions and, for each pixel, adaptive sparsity-based filtering is used to fuse multiple estimates from redundant representations of the overlapping regions, and,
wherein a type and a strength of the de-artifact filtering is adaptively selected responsive to characteristics of at least one of quantization noise statistics, coding modes and motion information, local coding conditions, and compression requirements.

23. The method of claim 22, further comprising configuring the de-artifacting filter for use in any of an in-loop configuration and an out-of-loop configuration.

24. The method of claim 23, further comprising replacing a deblocking filter with the de-artifacting filter when the de-artifacting filter is applied the in-loop configuration.

25. The method of claim 23, wherein the decoder includes a deblocking filter, and the method further comprises configuring the de-artifacting filter for use subsequent to the deblocking filter.

26. The method of claim 22, wherein the de-artifacting filter is a Wiener filter.

27. The method of claim 22, further comprising combining the replacement regions using weights prior to said restoring step.

28. The method of claim 27, wherein the grouped regions are transformed to obtain transform sparsity values there for, and the weights are determined responsive to the transform sparsity values.

29. A non-transitory computer-readable storage media having video signal data encoded thereupon executable by a computer for performing a method, the method comprising:
encoding at least a portion of an image by an encoder using de-artifact filtering, said encoder comprising a de-artifacting filter that performs the de-artifact filtering by grouping regions within the portion based on dimensions and characteristics of the region or portion, transforming the grouped regions, adaptively performing de-artifact filtering on the transformed regions, inverse transforming the de-artifacted regions to create replacement regions, and restoring the replacement regions to positions with the image from which the regions were taken prior to the grouping, wherein multiple estimates of the same pixel are obtained from overlapping regions and, for each pixel, adaptive sparsity-based filtering is used to fuse multiple estimates from redundant representations of the overlapping regions, and, wherein a type and a strength of the de-artifact filtering is adaptively selected responsive to characteristics of at least one of quantization noise statistics, coding modes and motion information, local coding conditions, and compression requirements.

\* \* \* \* \*